(12) United States Patent
Blumenthal et al.

(10) Patent No.: US 9,039,212 B2
(45) Date of Patent: May 26, 2015

(54) SOLAR CONCENTRATOR SYSTEMS

(75) Inventors: Yanir Blumenthal, Kfar Saba (IL); Oren Gadot, Nes Ziona (IL)

(73) Assignee: HELIOFOCUS LTD., Ness Ziona (IL)

( * ) Notice: Subject to any disclaimer, the term of this patent is extended or adjusted under 35 U.S.C. 154(b) by 898 days.

(21) Appl. No.: 13/153,605

(22) Filed: Jun. 6, 2011

(65) Prior Publication Data

US 2011/0235025 A1    Sep. 29, 2011

Related U.S. Application Data

(63) Continuation-in-part of application No. PCT/IL2009/001183, filed on Dec. 13, 2009.

(60) Provisional application No. 61/239,443, filed on Sep. 3, 2009, provisional application No. 61/239,441, filed on Sep. 3, 2009, provisional application No. 61/121,909, filed on Dec. 12, 2008.

(51) Int. Cl.
*F24J 2/54* (2006.01)
*F24J 2/10* (2006.01)
(Continued)

(52) U.S. Cl.
CPC *F24J 2/1047* (2013.01); *F24J 2/12* (2013.01); *F24J 2/38* (2013.01); *F24J 2/5233* (2013.01); *F24J 2/5254* (2013.01); *F24J 2/542* (2013.01); *F24J 2002/108* (2013.01); *F24J 2002/1095* (2013.01); *F24J 2002/385* (2013.01);
(Continued)

(58) Field of Classification Search
CPC ........... G01B 11/26; F24J 2/10; F24J 2/1047; F24J 2/12; F24J 2/541; Y02E 10/47; Y02E 10/45

USPC .......................................... 359/856; 126/606
See application file for complete search history.

(56) References Cited

U.S. PATENT DOCUMENTS

| 4,171,876 A | 10/1979 | Wood |
| 4,301,321 A | 11/1981 | Bartels |

(Continued)

FOREIGN PATENT DOCUMENTS

| DE | 3130226 | 2/1983 |
| IN | 207761 | 6/2007 |

(Continued)

OTHER PUBLICATIONS

International Search Report and Written Opinion of PCT/IL2009/001183, (2009).

(Continued)

*Primary Examiner* — Jennifer L. Doak
(74) *Attorney, Agent, or Firm* — Vorys, Sater, Seymour and Pease LLP; Susanne M. Hopkins

(57) ABSTRACT

A solar concentrating system including a concentrator operative to track the Sun so as to concentrate incident sunlight on to a focal location, the concentrator including a support structure, and an array of concentrating reflectors mounted on the support structure, wherein at least one of the reflectors is formed with a reflective surface facing the Sun and configured as a concave surface such that the incident sunlight impinging on the reflective surface is reflected on to the focal location, the array of concentrating reflectors being mounted on the support structure in a Fresnel-like reflector arrangement thus defining the concentrator as a Fresnel reflector.

27 Claims, 21 Drawing Sheets

(51) Int. Cl.
*F24J 2/12* (2006.01)
*F24J 2/38* (2014.01)
*F24J 2/52* (2006.01)

(52) U.S. Cl.
CPC .......... *F24J2002/5468* (2013.01); *Y02E 10/42* (2013.01); *Y02E 10/47* (2013.01)

(56) References Cited

U.S. PATENT DOCUMENTS

| | | | |
|---|---|---|---|
| 4,385,430 | A | 5/1983 | Bartels |
| 4,463,749 | A | 8/1984 | Sobczak et al. |
| 4,862,865 | A | 9/1989 | Dahlen et al. |
| 5,325,844 | A | 7/1994 | Rogers et al. |
| 5,578,140 | A | 11/1996 | Yogev et al. |
| 5,757,335 | A | 5/1998 | Kaneff et al. |
| 7,567,218 | B2 | 7/2009 | Whelan |
| 2004/0031483 | A1 | 2/2004 | Kinoshita |
| 2004/0103680 | A1* | 6/2004 | Lasich .................. 62/259.2 |
| 2005/0034751 | A1 | 2/2005 | Gross et al. |
| 2007/0095341 | A1 | 5/2007 | Kaneff |

FOREIGN PATENT DOCUMENTS

| | | |
|---|---|---|
| WO | WO9411918 | 5/1994 |
| WO | WO9602797 | 2/1996 |
| WO | WO03022578 | 3/2003 |
| WO | WO2007022756 | 3/2007 |
| WO | WO2009146511 | 12/2009 |
| WO | WO2010115237 | 10/2010 |
| WO | WO2011000045 | 1/2011 |

OTHER PUBLICATIONS

Kedare et al., ARUN Solar Concentrator for Industrial Process Heat Applications, http://mnre.gov.in/file-manager/UserFiles/arun_article_kedare.pdf, (Apr. 2006).
Solar Energy for Industrial Process Heat Applications, www.ese.iitb.ac.in/events/other/concentrator_workshop/profile.pdf, (Jan. 2006).

* cited by examiner

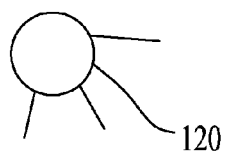
FIG. 2
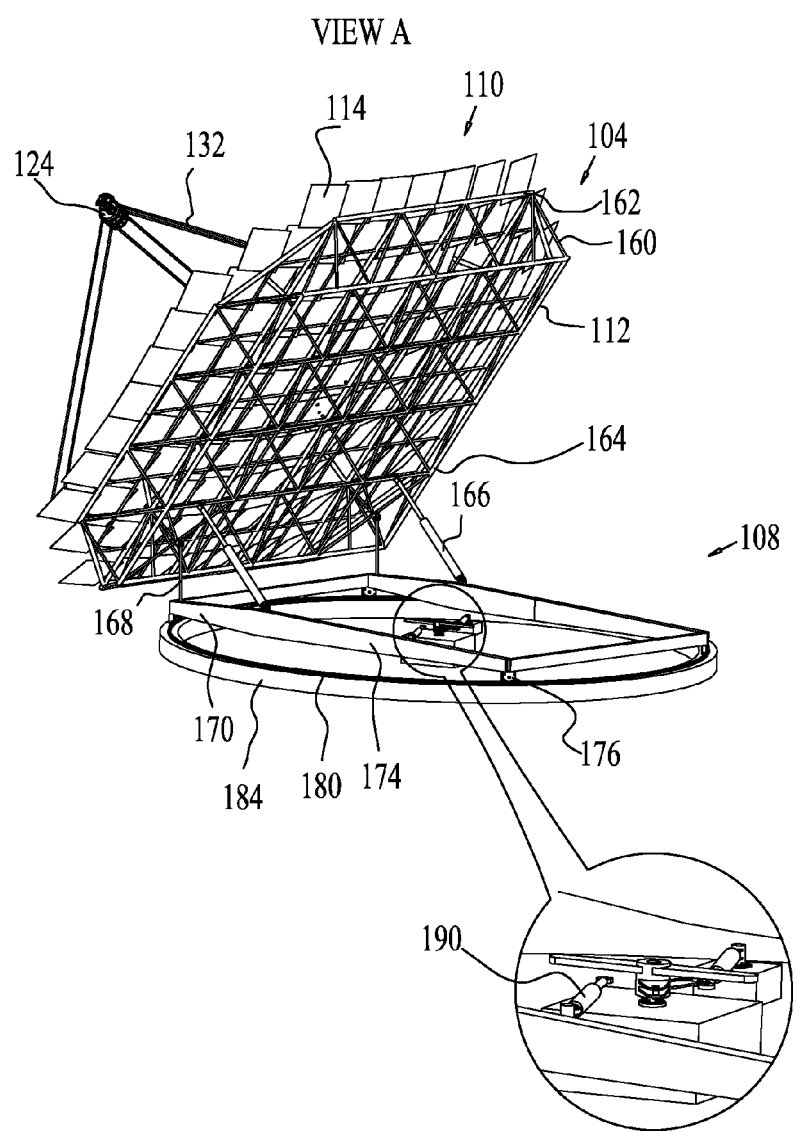

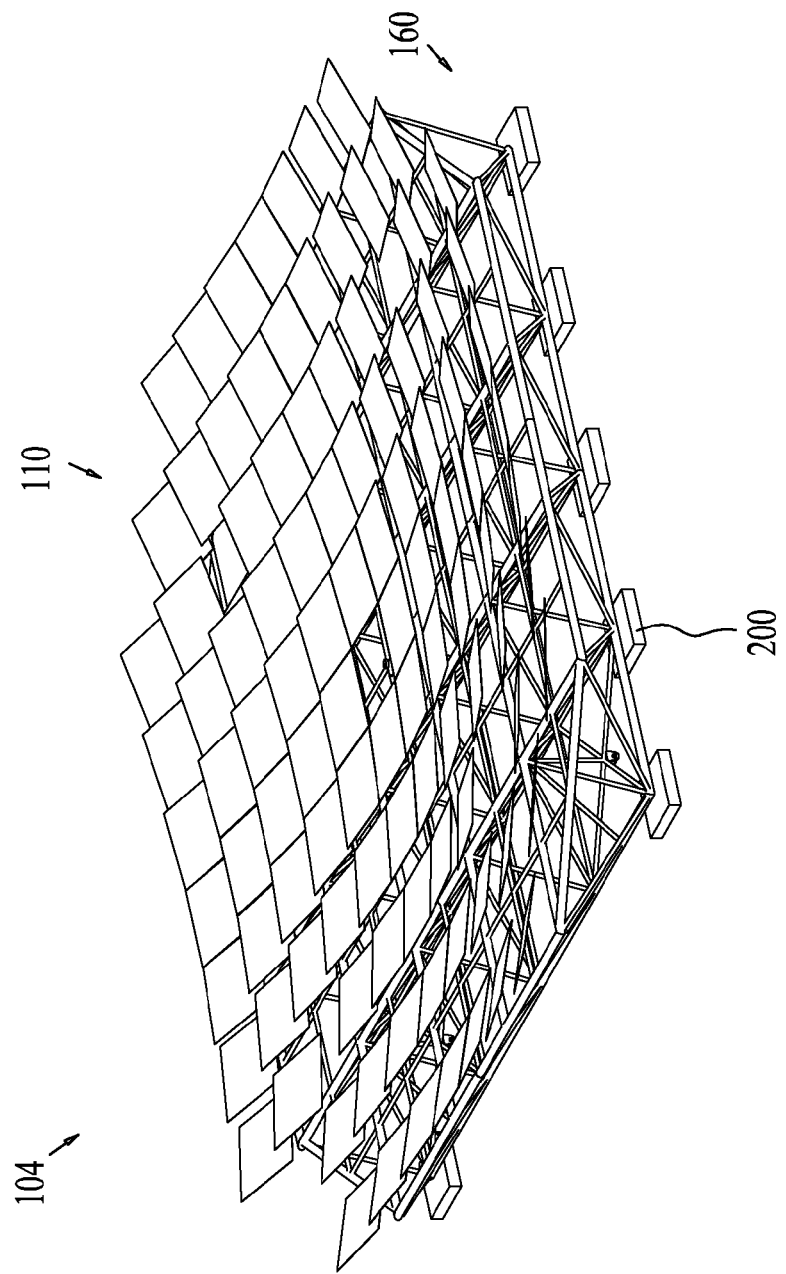

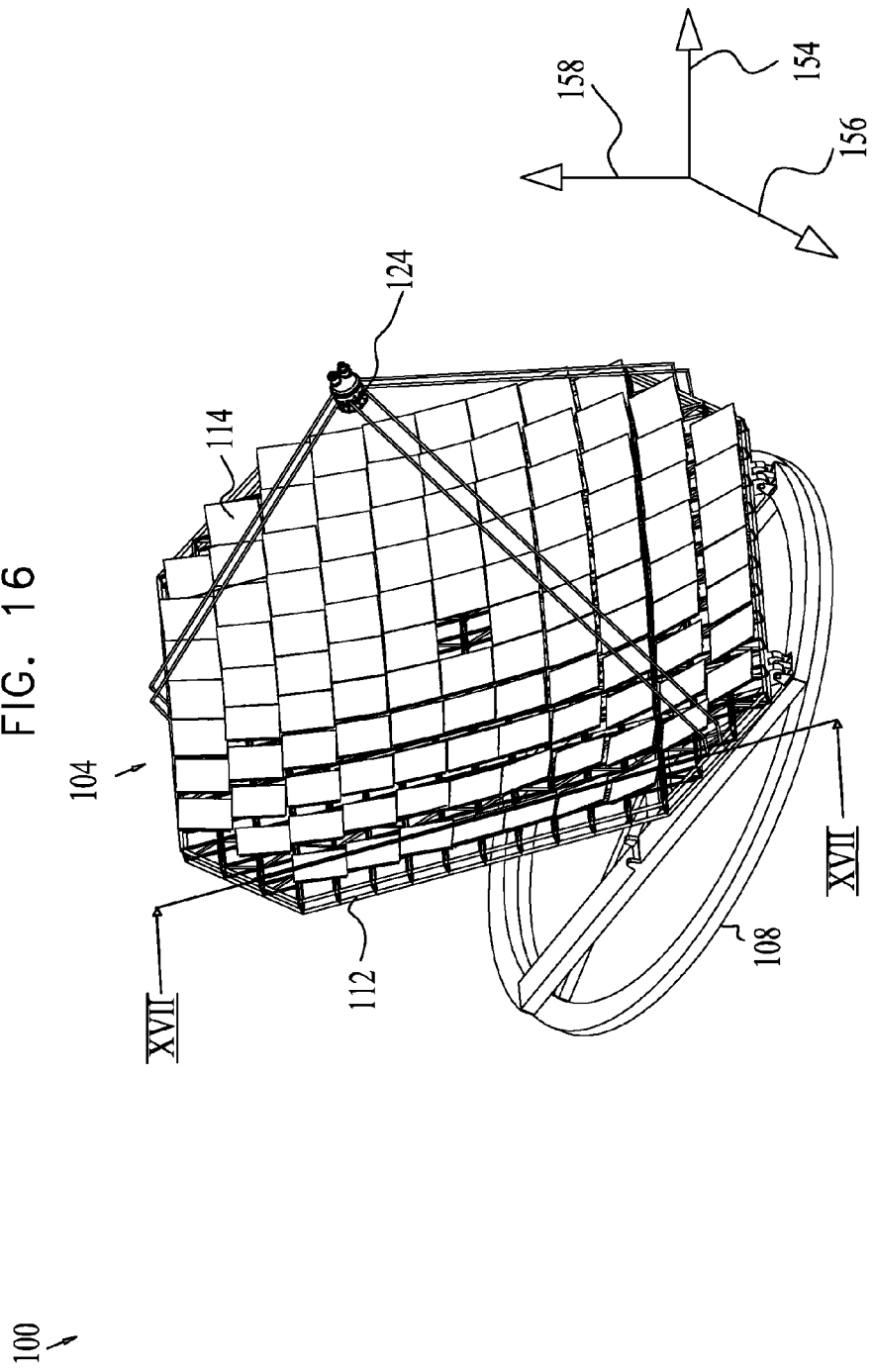

SOLAR CONCENTRATOR SYSTEMS

CROSS-REFERENCE TO RELATED APPLICATIONS

This application claims the benefit of priority under 35 U.S.C. §120 from PCT International Application No. PCT/IL2009/001183, which has an international filing date of Dec. 13, 2009, and which claims the benefit of priority from U.S. Provisional Patent Application No. 61/121,909, filed on Dec. 12, 2008, U.S. Provisional Patent Application No. 61/239,441, filed on Sep. 3, 2009, and U.S. Provisional Patent Application No. 61/239,443, filed on Sep. 3, 2009, all which are incorporated herein by reference in their entirety.

FIELD OF THE INVENTION

The present invention relates generally to solar concentrating systems.

BACKGROUND OF THE INVENTION

Solar concentrating systems use concentrators such as lenses, reflectors or mirrors and tracking systems to focus a large area of sunlight onto a focal location. The concentrated light is then used as a heat source for generation of electricity.

SUMMARY OF THE INVENTION

There is thus provided in accordance with an embodiment of the present invention a solar concentrating system including a concentrator operative to track the Sun so as to concentrate incident sunlight on to a focal location, the concentrator includes a support structure, and an array of concentrating reflectors mounted on the support structure, wherein at least one of the reflectors is formed with a reflective surface facing the Sun and configured as a concave surface such that the incident sunlight impinging on the reflective surface is reflected on to the focal location, the array of concentrating reflectors being mounted on the support structure in a Fresnel-like reflector arrangement thus defining the concentrator as a Fresnel reflector. Preferably, the concave surface is configured as a portion of a paraboloid. Furthermore, the reflective surface may be curved along two axes thereof. Additionally, the support structure is configured as a space structure and mounting of the array of the concentrating reflectors on the space structure is on an upper surface of the space structure, wherein the upper surface is formed as a generally flat surface. Moreover, the concentrator is mounted on a generally two dimensional base structure.

There is thus provided in accordance with another embodiment of the present invention a solar concentrating system including a concentrator operative to track the Sun so as to concentrate incident sunlight on to a focal location, the concentrator includes a support structure configured as a space structure, and an array of concentrating reflectors mounted on the support structure on an upper surface thereof, the upper surface being a generally flat surface. Accordingly, the concentrator is operative to track the Sun along two axes thereof.

There is thus provided in accordance with yet another embodiment of the present invention a solar concentrating system including a concentrator operative to track the Sun so as to concentrate incident sunlight on to a focal location, the concentrator includes a support structure configured as a space structure, and an array of concentrating reflectors mounted on the support structure, and a generally two dimensional base structure for mounting the support structure thereon, the base structure being placed on a flat surface, the base structure including a rotatable portion operative to rotate about a longitudinal axis perpendicular to the flat surface upon a stationary annular portion, thereby allowing the concentrator to track the Sun.

There is thus provided in accordance with still another embodiment of the present invention a solar concentrating system including a concentrator operative to track the Sun so as to concentrate incident sunlight on to a focal location, the concentrator including a support structure, and an array of concentrating reflectors mounted on the support structure, wherein at least one of the reflectors is formed with a reflective surface facing the Sun and configured as a concave surface such that the incident sunlight impinging on the reflective surface is reflected on to the focal location, the array of concentrating reflectors being mounted on the support structure in a Fresnel-like reflector arrangement thus defining the concentrator as a Fresnel reflector, the support structure being formed with protrusions on an upper surface thereof wherein the protrusions are formed with a Fresnel angular dislocation so as to allow the reflectors to be mounted on the support structure in accordance with the Fresnel angular dislocation of the protrusions. Accordingly, a reflector support is mounted on the protrusions and the reflector is mounted on the reflector support. Furthermore, the reflector support includes aligning screws operative to support the reflectors thereon. Moreover, the aligning screws are aligned in accordance with the Fresnel angular dislocation.

In accordance with an embodiment of the present invention alignment of the aligning screws is performed by a total station in optical and electrical communication with a prism reflector. Accordingly, the prism reflector is mounted on a jig. Moreover the jig is mounted on the reflector support.

There is thus provided in accordance with still another embodiment of the present invention a method for arranging a solar concentrating system in a Fresnel-like reflector arrangement including providing a solar concentrating system including a concentrator operative to track the Sun so as to concentrate incident sunlight on to a focal location, the concentrator including a support structure, and an array of concentrating reflectors mounted on the support structure, wherein at least one of the reflectors is formed with a reflective surface facing the Sun and configured as a concave surface such that the incident sunlight impinging on the reflective surface is reflected on to the focal location, the array of concentrating reflectors being mounted on the support structure in a Fresnel-like reflector arrangement thus defining the concentrator as a Fresnel reflector, the support structure being formed with protrusions on an upper surface thereof wherein the protrusions are formed with a Fresnel angular dislocation so as to allow the reflectors to be mounted on the support structure in accordance with the Fresnel angular dislocation of the protrusions, providing aligning screws included in a reflector support mounted on the protrusions, measuring an angular inaccuracy of the Fresnel angular dislocation on the aligning screws, rotating the aligning screws to correct the Fresnel angular dislocation, thereby arranging a solar concentrating system in a Fresnel-like reflector arrangement. Accordingly, the measuring is performed by a total station in optical and electrical communication with a prism reflector, the reflector prism mounted on a jig and engaged with the aligning screws via the jig mounted on the reflector support including the aligning screws.

There is thus provided in accordance with a further embodiment of the present invention a solar concentrating system including an array of concentrating reflectors mounted on a support structure, the reflectors being operative to reflect incident sunlight impinging thereon onto a predetermined focal location, a dislocation functionality engaged with at least one of the reflectors for tilting the reflector so as to reflect incident sunlight impinging thereon onto a location other than the predetermined focal location. Accordingly, the dislocation functionality includes a piston. Furthermore, a plurality of the reflectors are tilted. Additionally, the support structure includes a space structure.

There is thus provided in accordance with yet a further embodiment of the present invention a method for concentrating solar radiation including mounting an array of reflectors on a support structure, the reflectors being operative to reflect solar radiation impinging thereon onto a predetermined focal location, tilting at least one of the reflectors so as to reflect solar radiation impinging thereon onto a location other than the predetermined focal location.

There is thus provided in accordance with still a further embodiment of the present invention a concentrating reflector including a reflector base grid including a first plurality of bars intersecting a second plurality of bars thereby forming together the grid, wherein at least one of the first and second plurality of bars arch upwards, a plurality of reflector segments forming together the reflector and mounted on the grid, wherein a gap is formed between the grid at a peripheral location thereof and the segment mounted thereon, and a spacer operative to reduce the gap.

There is thus provided in accordance with still a furthermore embodiment of the present invention a solar concentrating system including a concentrator operative to track the Sun so as to concentrate incident sunlight on to a focal location, the concentrator including a support structure, and an array of concentrating reflectors mounted on the support structure, wherein at least one of the reflectors is formed with a reflective surface facing the Sun and configured as a concave surface such that the incident sunlight impinging on the reflective surface is reflected on to the focal location, the concave surface of the reflector formed by bending the reflector by use of a mechanical force. Accordingly, the bending of the reflector is performed by use of a screw. Additionally, the bending of the reflector is performed on a support element underlying the reflector.

BRIEF DESCRIPTION OF THE DRAWINGS

The present invention will be understood and appreciated more fully from the following detailed description, taken in conjunction with the drawings in which:

FIG. 2 is a simplified pictorial illustration of the solar concentrator system of FIG. 1 shown in the orientation of arrow A in FIG. 1;

FIG. 7 is a simplified pictorial illustration of elements of the concentrator of the solar concentrator system of FIG. 1 at a final stage of assembly;

FIG. 16 is a simplified pictorial illustration of the solar concentrator system of FIG. 1 at an initial operational stage;

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Figure 1:
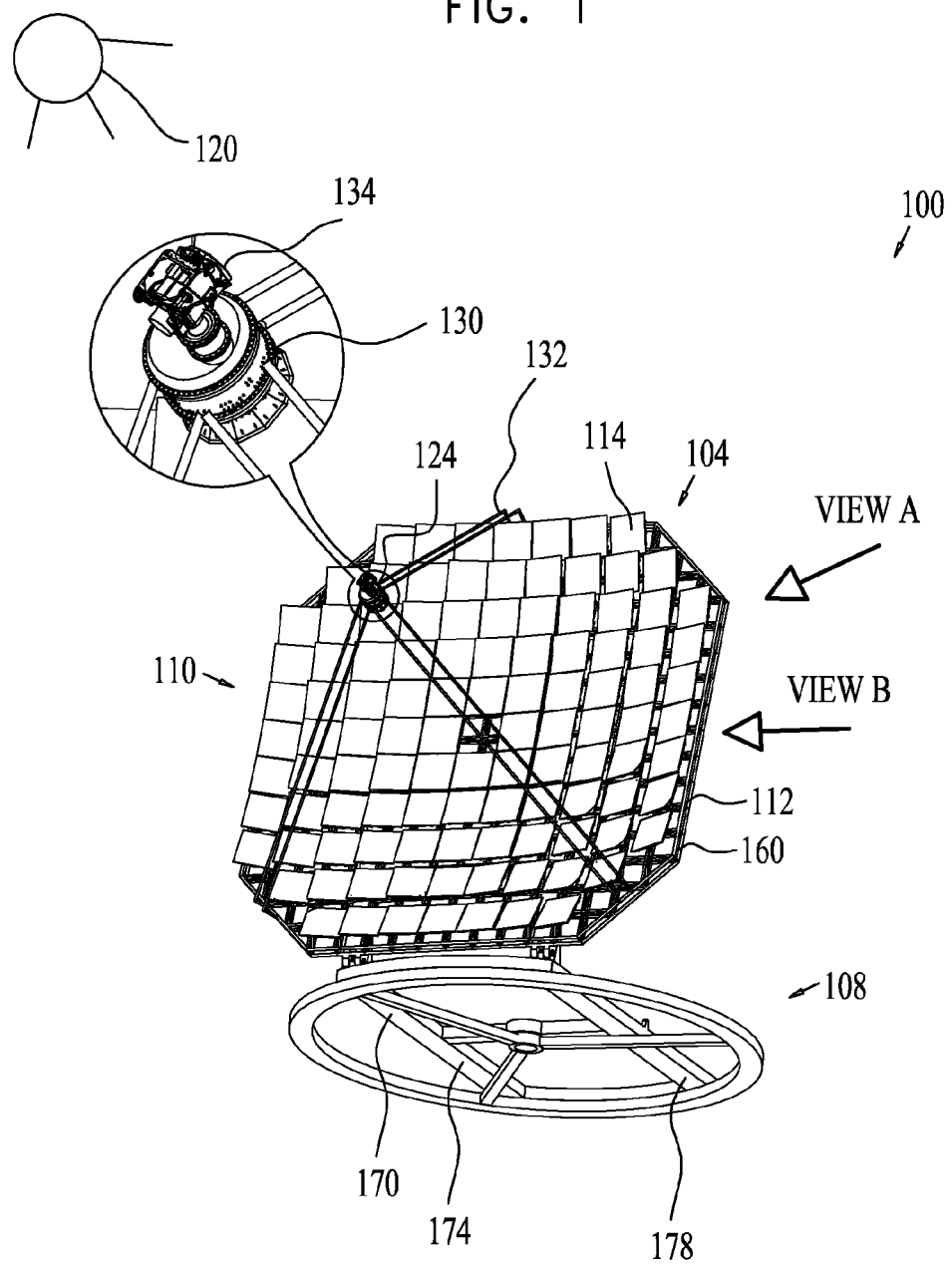
FIG. 1 is a simplified pictorial illustration of a solar concentrator system constructed and operative in accordance with an embodiment of the present invention.
Figure 3:
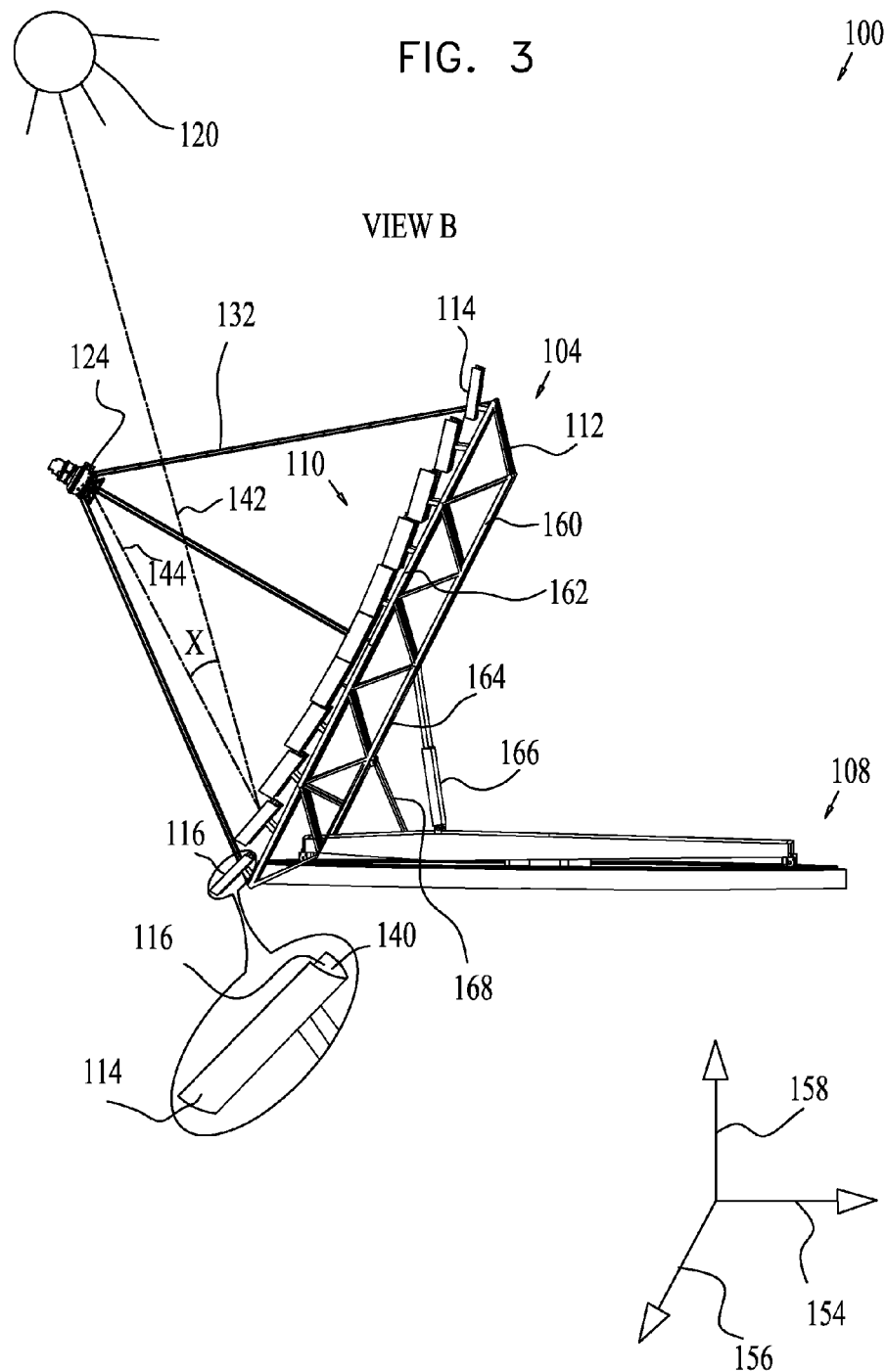
FIG. 3 is a simplified pictorial illustration of the solar concentrator system of FIG. 1 shown in the orientation of arrow B in FIG. 1.

Reference is now made to FIGS. 1-3, which are a simplified pictorial illustration of a solar concentrator system constructed and operative in accordance with an embodiment of the present invention, a simplified pictorial illustration of the solar concentrator system of FIG. 1 shown in the orientation of arrow A in FIG. 1 and a simplified pictorial illustration of the solar concentrator system of FIG. 1 shown in the orientation of arrow B in FIG. 1, respectively. As seen in FIGS. 1-3, a solar concentrator system 100 comprises a concentrator 104 supported by a base structure 108. The concentrator 104 may comprise an array 110 of concentrating reflectors mounted on a support structure 112. Concentrator 104 may be any suitable concentrator. The concentrator may be operative to track the Sun along two axes thereof. In the embodiment shown in FIGS. 1-3 the concentrator is formed as a dish.

The array 110 comprises a plurality of concentrating reflectors 114 wherein each of the reflectors 114 is formed with a reflective surface 116 (FIG. 3) facing the Sun 120 and is provided to concentrate incident sunlight impinging thereon and reflect the concentrated sunlight back to a predetermined focal location 124. Thermal energy of the concentrated light may be utilized to produce electricity therefrom in any suitable manner. For example, in the embodiment shown in FIGS. 1-3, a solar receiver 130 may be mounted at focal location 124 and supported by support cables 132. The receiver 130 is provided to heat a working fluid therein utilizing the thermal energy of the concentrated light. The heated working fluid may thereafter be expanded in a turbine 134 so as to generate electricity.

Preferably, the reflective surface 116 of a reflector 114 is formed as a concave surface 140 so as to reflect the sunlight impinging thereon. The reflective surface 116 may be curved along a single axis thereof. Alternatively, the reflective surface 116 may be curved along two axes thereof. The concave surface 140 may be configured as a portion of a paraboloid, a portion of a spheroid or in any suitable configuration, generally with a relatively small curvature radius. In a non-limiting example, the depth of the concave surface may be 1.6% of the breadth of the reflector 114.

The reflectors 114 may be formed by any suitable method such as by use of heat or extrusion, for example. A material of reflectors 114 may be heated to a relatively high temperature, so as to allow bending of the material to a desired concave configuration and thereafter removing the bent material from the heat and annealing thereby, thus obviating the need for specific, controlled annealing. Additionally, the reflectors 114 may be produced by the methods described hereinbelow in reference to FIGS. 8-15B. The reflectors 114 may be formed of a bendable and reflective material, such as aluminum or silver, for example. Alternatively, the reflectors 114 may be formed of a bendable material, such as glass, with a reflective material adhered thereto by any suitable means, so as to form reflective surface 116.

The array 110 of reflectors 114 may be arranged on support structure 112 in any suitable arrangement. As seen in the embodiment shown in FIGS. 1-3, the array 110 may be arranged in a Fresnel-like reflector arrangement thereby forming the concentrator 104 as a Fresnel reflector. In this Fresnel-like reflector arrangement a reflector 114 forms an angle X between a ray 142 (FIG. 3) of sunlight impinging thereon and a reflected ray 144, which extends from the reflective surface 116 to focal location 124. It is appreciated that wherein the reflectors 114 are arranged in the Fresnel-like arrangement the angle X of a given reflector varies according to the position of the given reflector along the Fresnel-like arrangement. It is noted that angle X is a spatial angle defined by a horizontal angular displacement relative to a horizontal axis 154, a vertical angular displacement relative to a vertical axis 156 and a longitudinal angular displacement relative to a longitudinal axis 158, as shown in FIG. 3.

Figure 20:
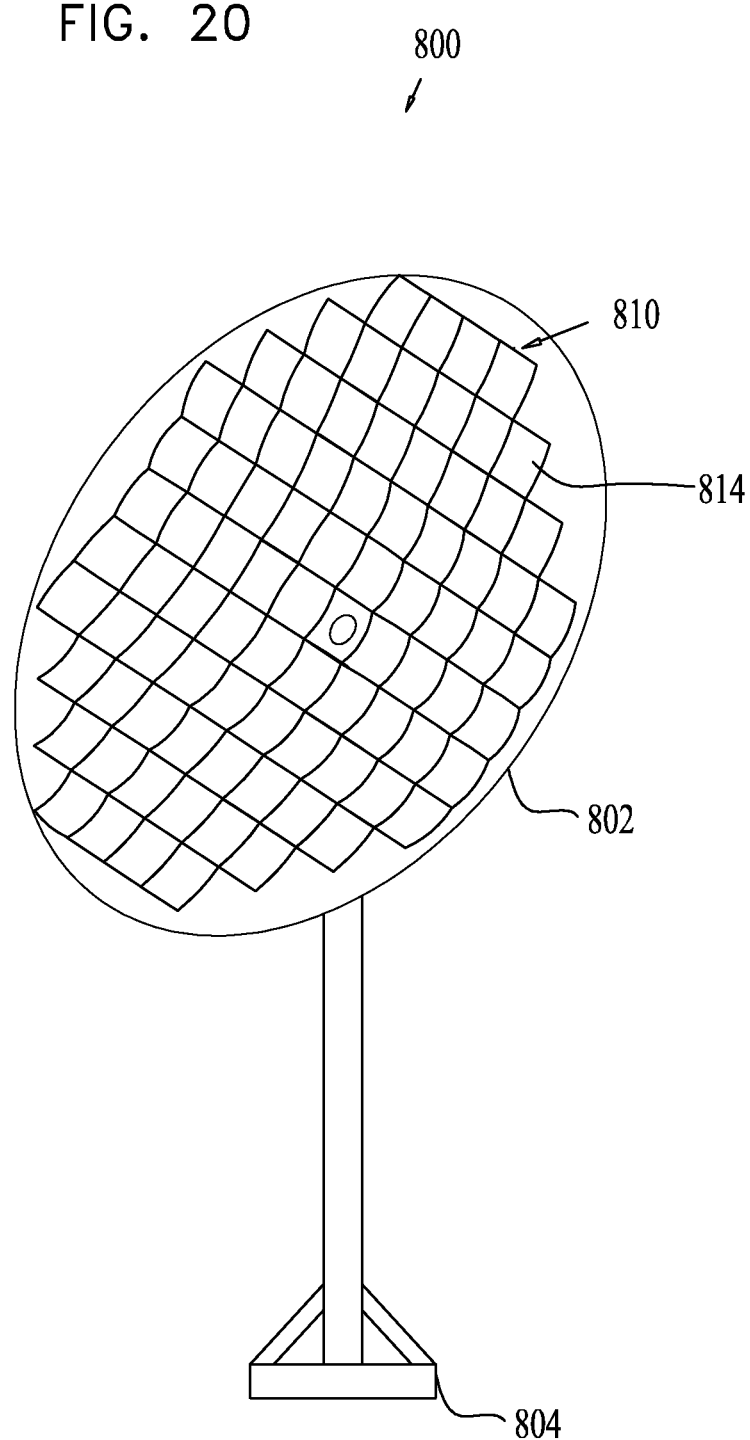
FIG. 20 is a solar concentrator system constructed and operative in accordance with another embodiment of the present invention.

Alternatively, the array 110 of reflectors 114 may be arranged on support structure 112 in a concave parabolic-like arrangement, as shown in FIG. 20 hereinbelow, or in any suitable arrangement allowing concentration of sunlight impinging thereon.

Support structure 112 may be formed of any suitable material, such as steel, for example, and in any suitable configuration operative to support array 110 thereon. As seen in the embodiment shown in FIGS. 1-3, the support structure 112 is configured as a space structure 160 of any suitable construction. The space structure 160 may be defined as a three-dimensional truss composed of linear elements subjected to compression or tension. The array 110 is mounted upon an upper surface 162 of the space structure 160. Preferably, upper surface 162 is formed as a generally flat surface, as seen in FIGS. 1-3.

The inherent stability of the space structure 160 enhances the stability of the concentrator 104, which may be subjected to harsh environmental conditions, such a winds. Additionally, the space structure 160 may be mounted on the base structure 108 employing relatively few supporting elements due to the inherent stability of the space structure 160. As seen in FIGS. 2 and 3, the space structure 160 is supported on a lower portion 164 thereof by relatively few supporting elements, such as pistons 166 and supporting beams 168. It is noted that additional supporting elements may be employed, such as a truss girder and/or a tilt arm (not shown).

The base structure 108 may comprise a rotatable portion 170 generally formed as a rectangular frame 174. The rotatable portion 170 may be equipped with wheels 176 on an underside surface 178 thereof. The wheels 176 turn within a recess 180 defined within a stationary annular portion 184 of base structure 108. In the embodiment shown in FIGS. 1-3 the base structure 108 is formed as a generally two dimensional structure.

The stationary annular portion 184 is placed upon a flat surface defined as a plain perpendicular to longitudinal axis 158. Typically, the flat surface is the ground. Thus, the rotatable portion 170 is operative to rotate about longitudinal axis 158 thereby allowing the concentrator 104 to track the Sun 120. Rotation elements, such as pistons 190 may be provided so as to allow the rotational movement of rotatable portion 170. A skilled artisan will appreciate that the rotation elements and pistons 166 may be governed by any suitable hydraulic control regime.

The rotatable portion 170 may be formed of any suitable material, such as steel, for example. The stationary annular portion 184 may be formed of any suitable material, such as concrete, for example.

Figure 4:
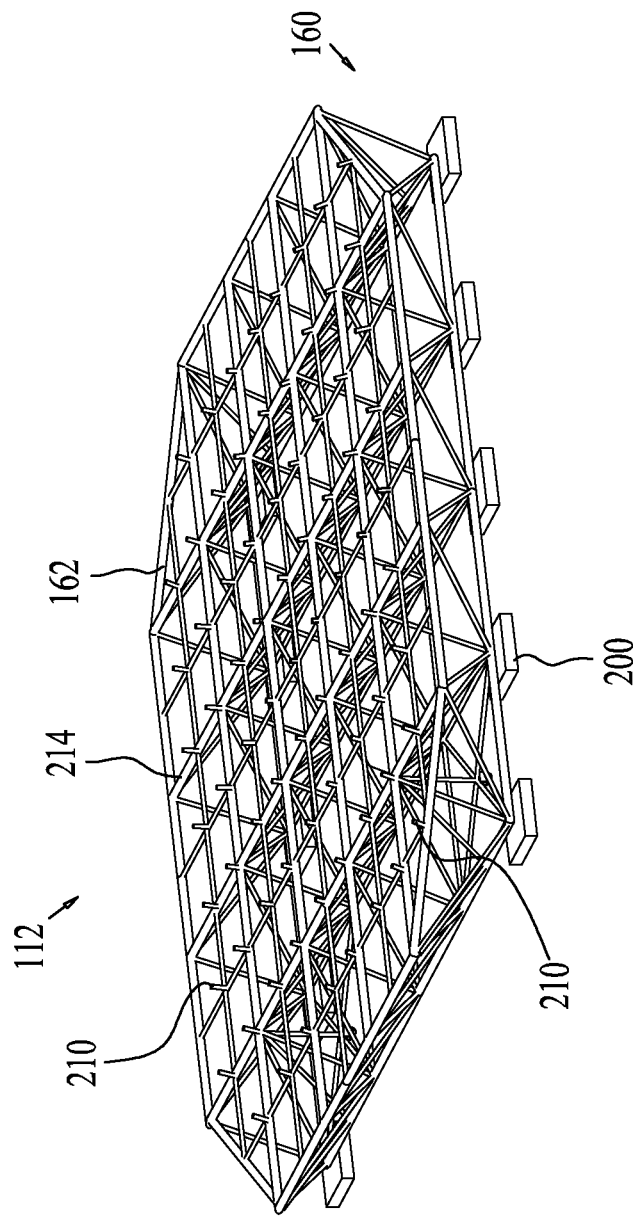
FIG. 4 is a simplified pictorial illustration of elements of a concentrator of the solar concentrator system of FIG. 1 at an initial stage of assembly.
Figure 5:
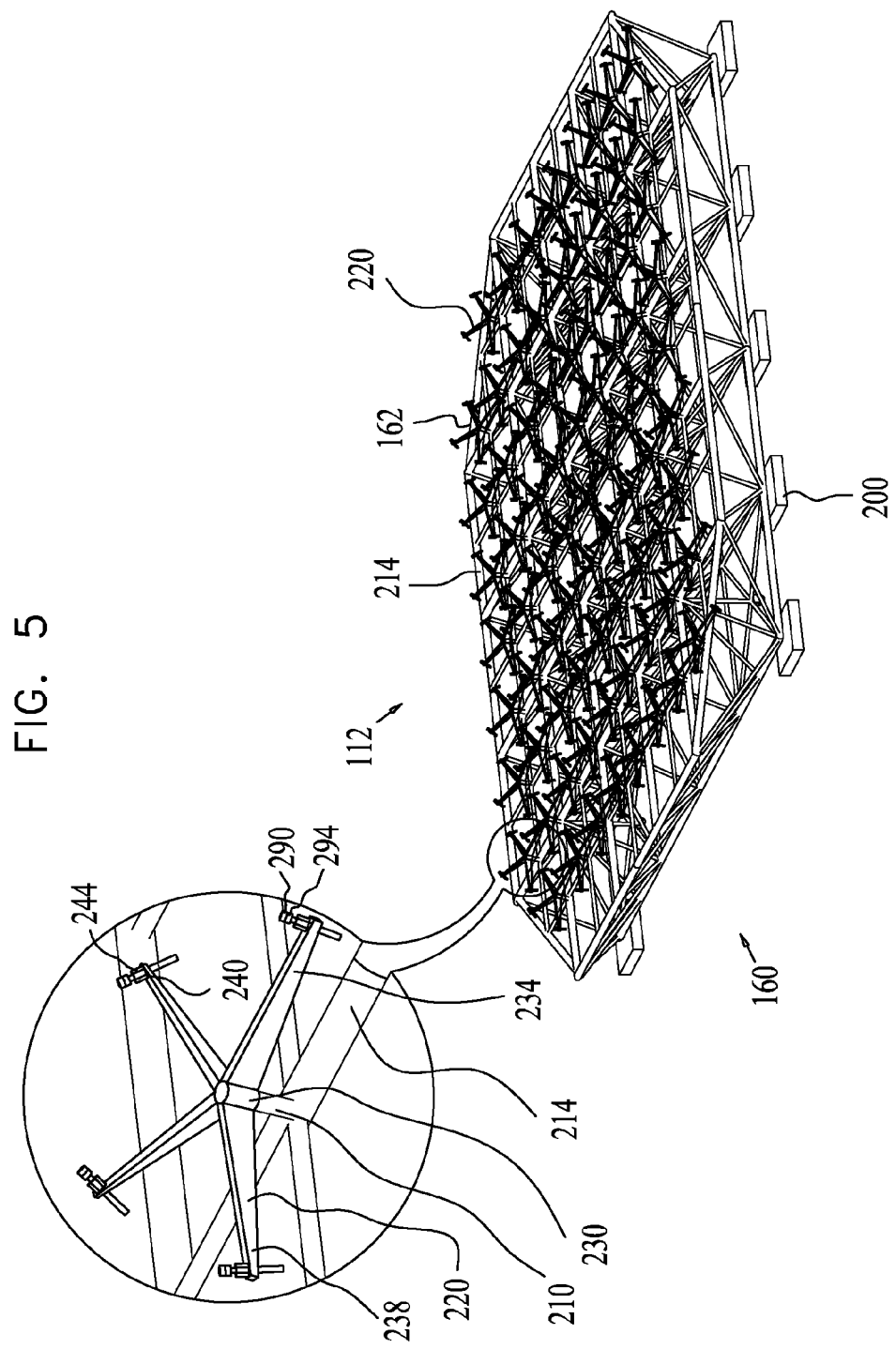
FIG. 5 is a simplified pictorial illustration of elements of the concentrator of the solar concentrator system of FIG. 1 at an intermediate stage of assembly.

Reference is now made to FIGS. 4-7, which are a simplified pictorial illustration of elements of a concentrator of the solar concentrator system of FIG. 1 at an initial stage of assembly, a simplified pictorial illustration of elements of the concentrator of the solar concentrator system of FIG. 1 at an intermediate stage of assembly; a simplified pictorial illustration of elements of the concentrator as shown in FIG. 5 at an initial stage of calibration and at a final stage of calibration, and a simplified pictorial illustration of elements of the concentrator of the solar concentrator system of FIG. 1 at a final stage of assembly, respectively.

As seen in FIG. 4, the support structure 112 may be placed upon a plurality of mounting bases 200 provided for assembly of the concentrator 104. The support structure 112 is formed on upper surface 162 thereof with aligning protrusions 210 generally protruding from junctions of beams 214 of the space structure 160 defining the support structure 112. The protrusions 210 may be configured as tubes and may be manufactured together with the beams 214 of the space structure 160 and may be formed of any suitable material, such as steel.

On each protrusion 210 is mounted a reflector support 220 (FIG. 5) for supporting a reflector 114 thereon. Protrusions 210 are preferably formed on space structure 160 with an angular dislocation corresponding to the Fresnel-like arrangement of the reflectors 114 so as to align the reflector supports 220 and, in turn, the reflectors 114 according to the Fresnel-like arrangement.

Turning to FIG. 5 the reflector supports 220 are shown mounted on the protrusions 210. Each reflector support 220 may be formed with a central cylindrical base 230 defining a recess therein so as to be mounted on the protrusion 210. A plurality of arms 234 extend upwardly from base 230. At an edge 238 of each arm 234 is defined a bore 240 provided to receive an aligning screw 244 inserted therein.

The reflector support 220 may be formed of any suitable material, such as steel.

As described hereinabove, the protrusions 210 and, in turn, the reflector supports 220 are positioned upon the space structure 160 such that the reflectors 114 supported thereon are arranged in a Fresnel-like arrangement. The angular dislocation of the protrusions 210 may be slightly inaccurate due to inaccuracies occurring during manufacturing thereof. Therefore, the reflector supports 220 may be calibrated so as to correct these inaccuracies and thereby position the reflectors 114 in the Fresnel-like arrangement.

Figure 6A:
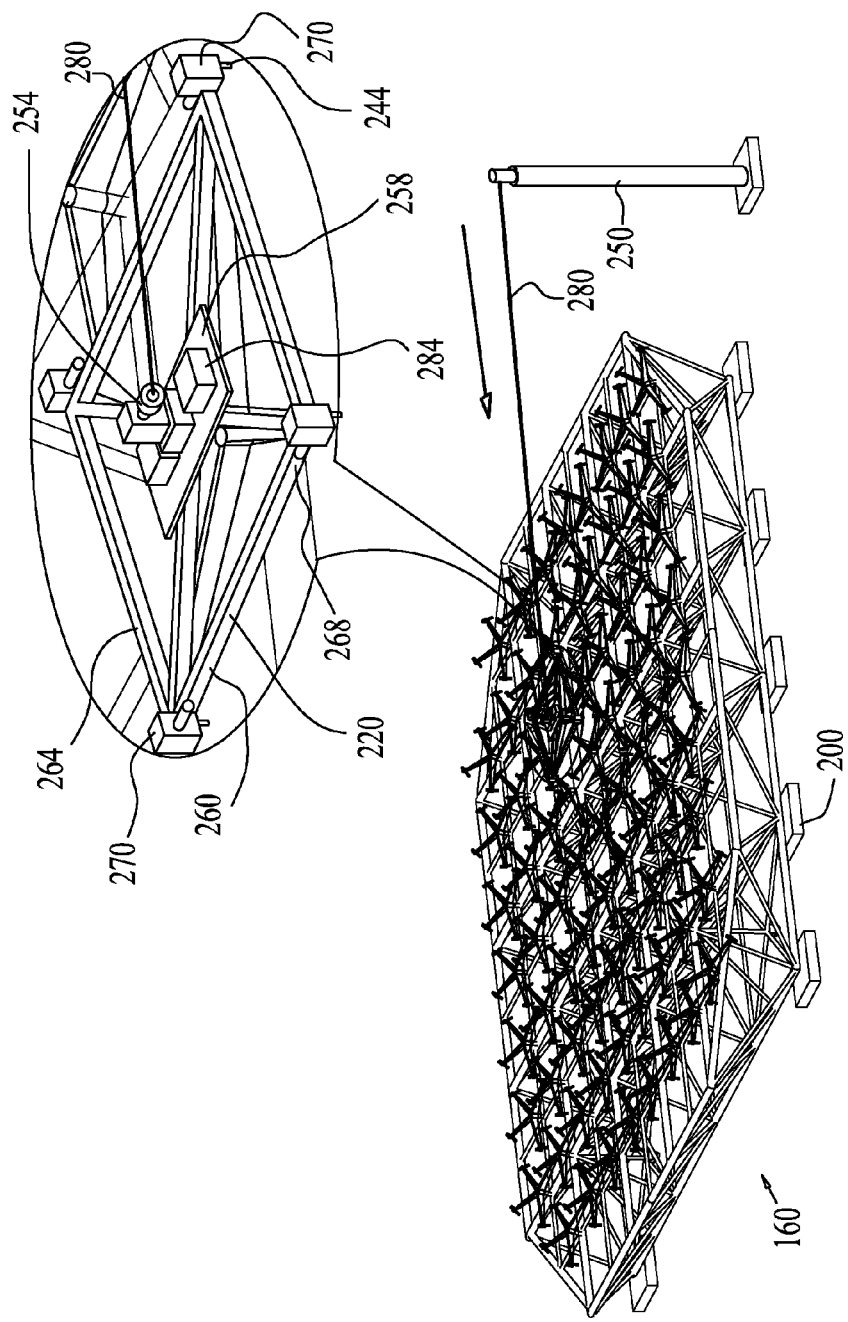
FIGS. 6A and 6B are each a simplified pictorial illustration of elements of the concentrator as shown in FIG. 5 at an initial stage of calibration and at a final stage of calibration, respectively.

As seen in FIG. 6A, a total station 250 may be provided and is in optical and electronic communication with a prism reflector 254 of a prism reflector assembly 258. The prism reflector assembly 258 may be supported by a jig 260 generally formed of a rectangular frame 264. At each corner 268 of the frame 264 may be placed a motorized aligning guide 270 defining a recess therein so as to receive an aligning screw 244 within the recess. The total station 250 contains information regarding the accurate Fresnel angular dislocation defining the Fresnel-like arrangement and is operative to measure the spatial location of the prism reflector 254. Thus by comparing the accurate Fresnel angular dislocation with the actual spatial location of the prism reflector 254 the angular inaccuracy is measured.

Figure 6B:
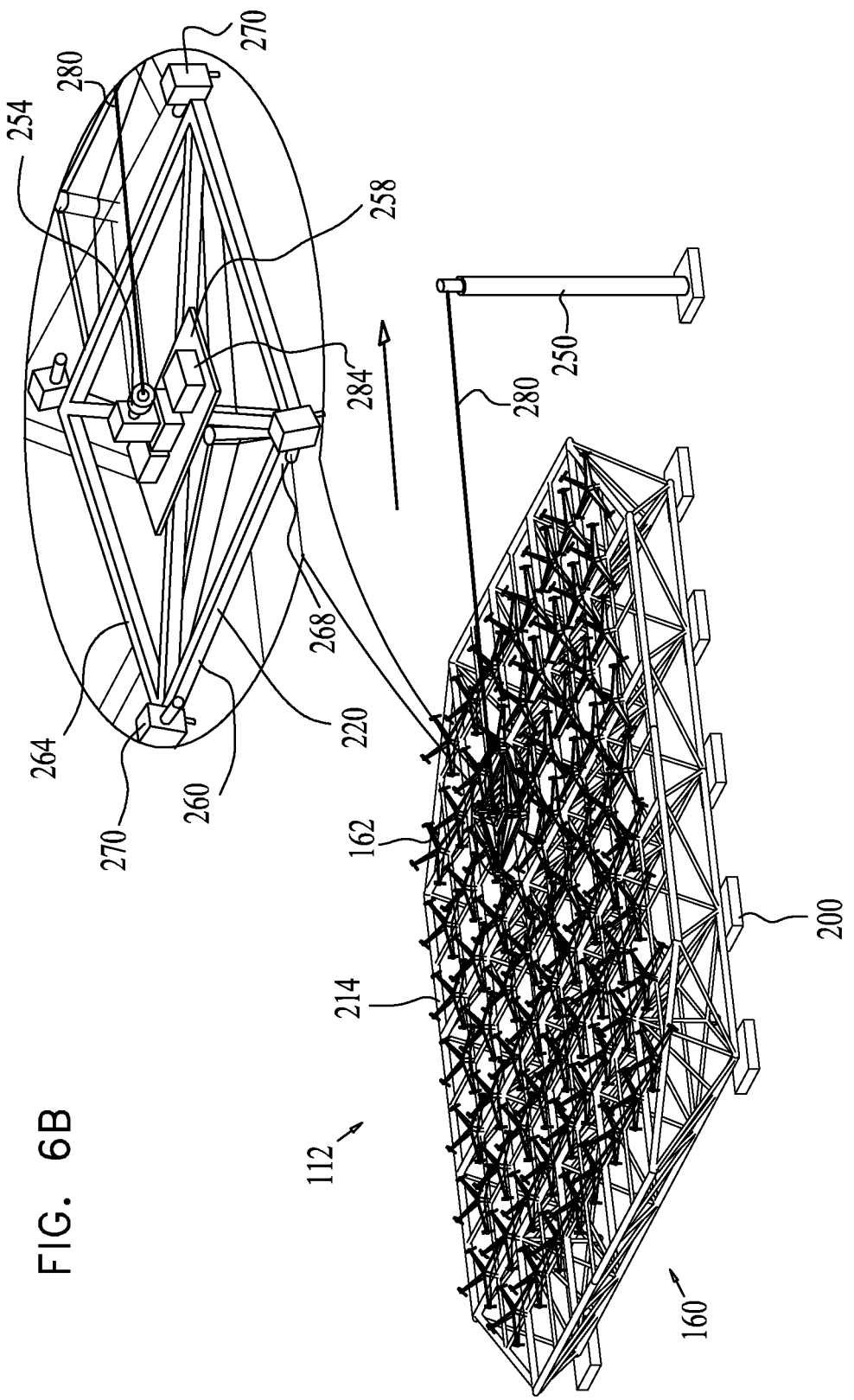

During an initial stage of calibration the jig 260 is placed upon a reflector support 220 and is mounted thereon such that each screw 244 is inserted within a recess of a guide 270. A laser beam 280 or any other suitable signal is projected by the total station 250 to the prism reflector 254. As seen in FIG. 6B the laser beam 280 is reflected back to the total station 250 thereby measuring the angular inaccuracy of the position of the jig 260, and in turn the reflector support 220, relative to the Fresnel angular dislocation. The motorized aligning guides 270 are prompted to rotate to the accurate Fresnel angular dislocation position so as to correct the angular inaccuracy. Thereby the screws 244 are accurately positioned in accordance with the Fresnel angular dislocation. It is noted that control units 284 may be included in the prism reflector assembly 258 for controlling the rotation of aligning guides 270.

The total station 250 and prism reflector 254 may be any suitable device. For example, the total station 250 and prism reflector 254 may be commercially available by Leica Geosystems AG of Heinrich Wild St., of St. Gallen, Switzerland under the catalogue number of Leica TS30.

The jig 260 may be placed on each reflector support 220 by any suitable method, such as automatically or manually.

This method of calibration described hereinabove allows for generally standard manufacturing of the support structure 112 so as to obtain generally standard manufacturing accuracies and thereafter correct the manufacturing inaccuracies by the calibration process described hereinabove.

Following calibration of the reflector supports 220 the reflectors 114 are mounted thereon thus assembling the concentrator 104, as seen in FIG. 7. Reflectors 114 may be attached to reflector support 220 in any suitable manner. For example, a reflector 114 may be adhered to a ceramic pad 290 formed on an upper surface 294 of screws 244 by any suitable glass bonding adhesive.

Thereafter the concentrator 104 is mounted on to the base structure 108 following removal of mounting bases 200. The receiver 130 and turbine 134 may be mounted by any suitable means, thereby assembling the solar concentrating system 100 as shown in FIG. 1.

Figure 8:
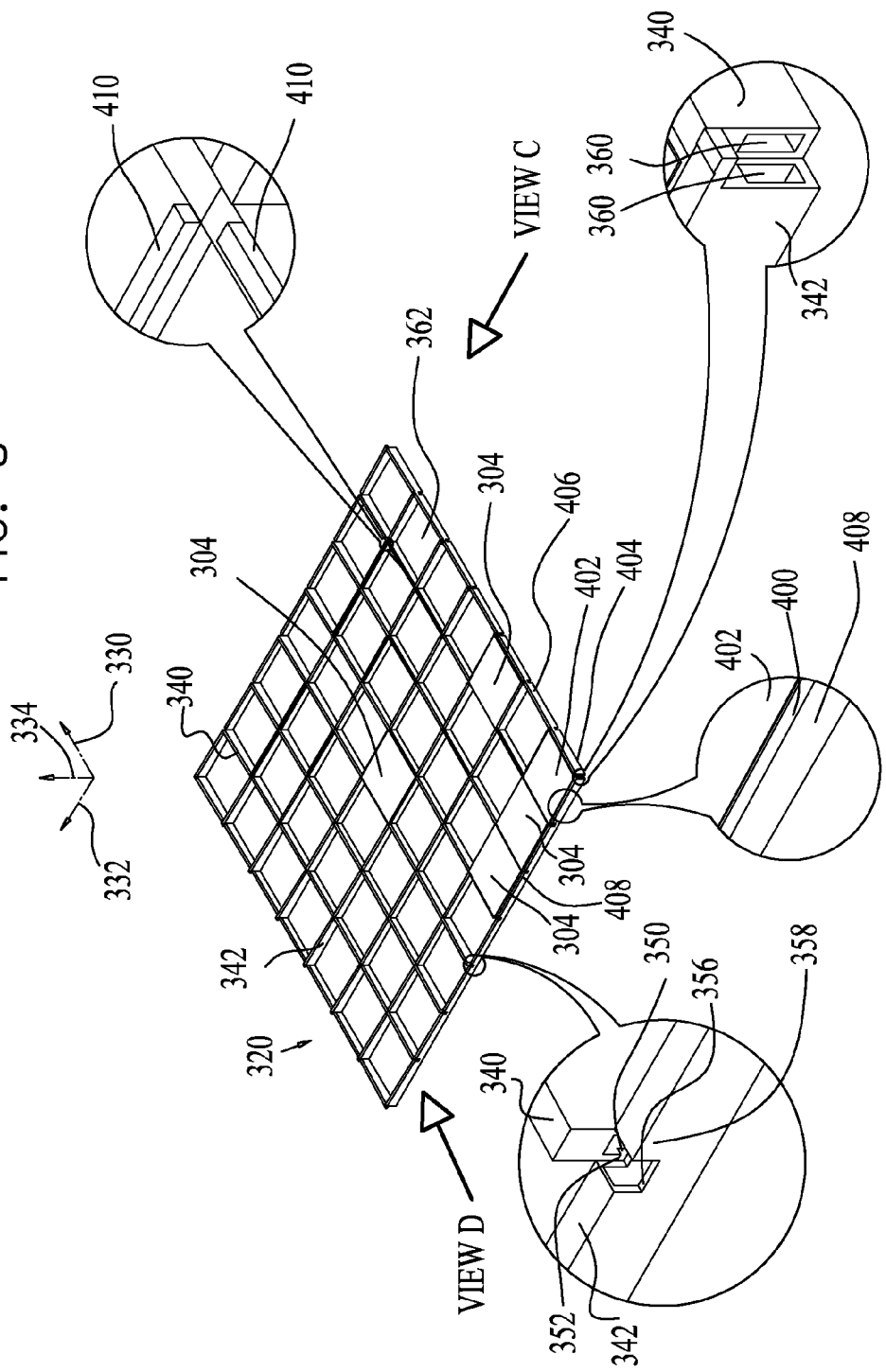
FIG. 8 is a simplified pictorial illustration of a reflector of the solar concentrator system of FIG. 1 constructed and operative in accordance with an embodiment of the present invention.

Reference is now made to FIG. 8, which is a simplified pictorial illustration of a reflector of the solar concentrator system of FIG. 1 constructed and operative in accordance with an embodiment of the present invention. In the embodiment shown in FIGS. 8-9B, a reflector 114 of FIG. 1 may be comprised of a plurality of reflector segments 304 mounted on a reflector base grid 320. The reflector base grid 320 lies on a plane which is defined by a horizontal axis, designated by reference numeral 330, a vertical axis, designated by reference numeral 332 and a longitudinal axis, designated by reference numeral 334.

Grid 320 comprises a plurality of horizontal bars 340 intersecting a plurality of vertical bars 342. The horizontal bars 340 may be formed with a plurality of recesses 350 in a bottom portion 352 thereof and the vertical bars 342 may be formed with corresponding plurality of recesses 356 in a top portion 358 thereof. Horizontal bars 340 are mounted onto vertical bars 342 by placing horizontal bars 340 at recesses 350 within recesses 356 of vertical bars 342. It is appreciated that the horizontal bars 340 and vertical bars 342 may be mounted thereon in any suitable manner.

Horizontal bars 340 and vertical bars 342 may be formed of any suitable material, such as aluminum, for example. Horizontal bars 340 and vertical bars 342 may each be formed with a throughgoing cavity 360 defined therein so as to reduce the weight of each bar.

Each segment 304 is mounted on an interstice 362 of grid 320 by any suitable means, such as by adhering the segment 304 to horizontal bars 340 and vertical bars 342. Segments 304 are formed of any suitable material, such as glass or a metal, such as aluminum or silver, for example, and are configured in a generally flat rectangular shape.

It is noted that in FIG. 8 only a few segments 304 are shown mounted on interstices 362 for clarity of the description, it being appreciated that in a fully assembled state all interstices 362 have segments 304 mounted thereon thereby forming reflector 114.

Figure 9A:
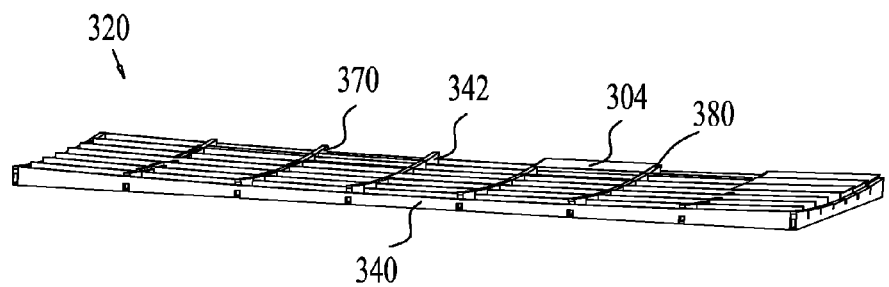
FIGS. 9A and 9B are each a simplified pictorial illustration of the reflector of FIG. 8 shown in the orientation of arrows C and D in FIG. 8, respectively.
Figure 9B:
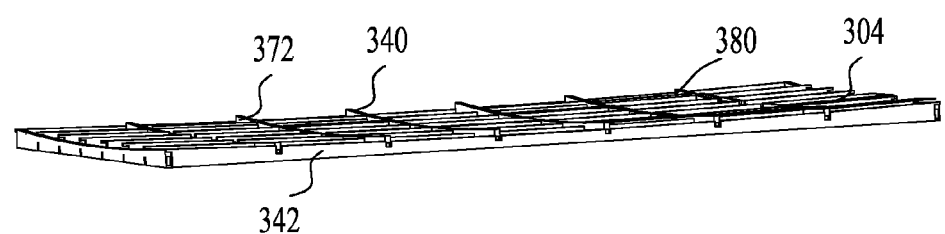

Reference is now made to FIGS. 9A and 9B, which are each a simplified pictorial illustration of the grid 320 of FIG. 8 shown in the orientation of arrows C and D in FIG. 8, respectively. As seen in FIG. 9A, each vertical bar 342 may define on a top surface 370 thereof a generally arched surface. Similarly, as shown in FIG. 9B, each horizontal bar 340 may define on a top surface 372 thereof a generally arched surface. Thus a resultant top surface 380 of grid 320, comprised of top surfaces 370 and 372, defines a concave surface, such as concave surface 140 shown in FIG. 3. Accordingly, the segments 304, mounted on interstices 362, form together a reflective surface configured as concave surface 140.

The concave surface configuration of the segments 304 allows for a relatively simple configuration, wherein all horizontal bars 340 may be generally identical and all vertical bars 342 may be generally identical, while providing optimal focusing of sunlight impinging upon segments 304 to a focal location 124 (FIG. 1). Use of identical horizontal bars 340 and identical vertical bars 342 allows for simplifying the design of grid 320 and reduction of cost of manufacturing of grid 320 by allowing multiple production of identical horizontal bars 340 and identical vertical bars 342.

As seen in FIG. 8, gaps 400 may be formed between peripheral segments, here designated by reference numeral 402, located at periphery 404 of grid 320, and peripheral horizontal and vertical bars, here designated by reference numeral 406 and 408, respectively. Gaps 400 are formed at the periphery 404 of grid 320 due to upward arching of peripheral horizontal and vertical bars 406 and 408, which bars 406 and 408 underlie flat peripheral segments 402.

It is a particular feature of the present invention that spacers defined by shims 410 may be provided between peripheral segments 402 and underlying peripheral horizontal and vertical bars 406 and 408 so as to reduce gap 400 and ensure stable mounting of peripheral segments 402 thereon. Shims 410 may be formed of any suitable material, such as aluminum, for example. Shims 410 may be mounted on peripheral horizontal and vertical bars 406 and 408 in any suitable manner, such as by use of a threaded attachment.

Use of shims 410 to fill gaps 400 allows for forming grid 320 of identical horizontal bars 340 and identical vertical bars 342 thereby obviating the need to design peripheral horizontal and vertical bars differently than central horizontal and vertical bars, thus allowing for simplifying the design of grid 320 and reduction of cost of manufacturing of grid 320.

It is noted that shims 410 may differ in size so as to fit different gap sizes formed between peripheral horizontal and vertical bars and peripheral reflectors.

It is appreciated that any suitable means for filling gaps 400 may be used, such as applying a bonding material therein.

Figure 10:
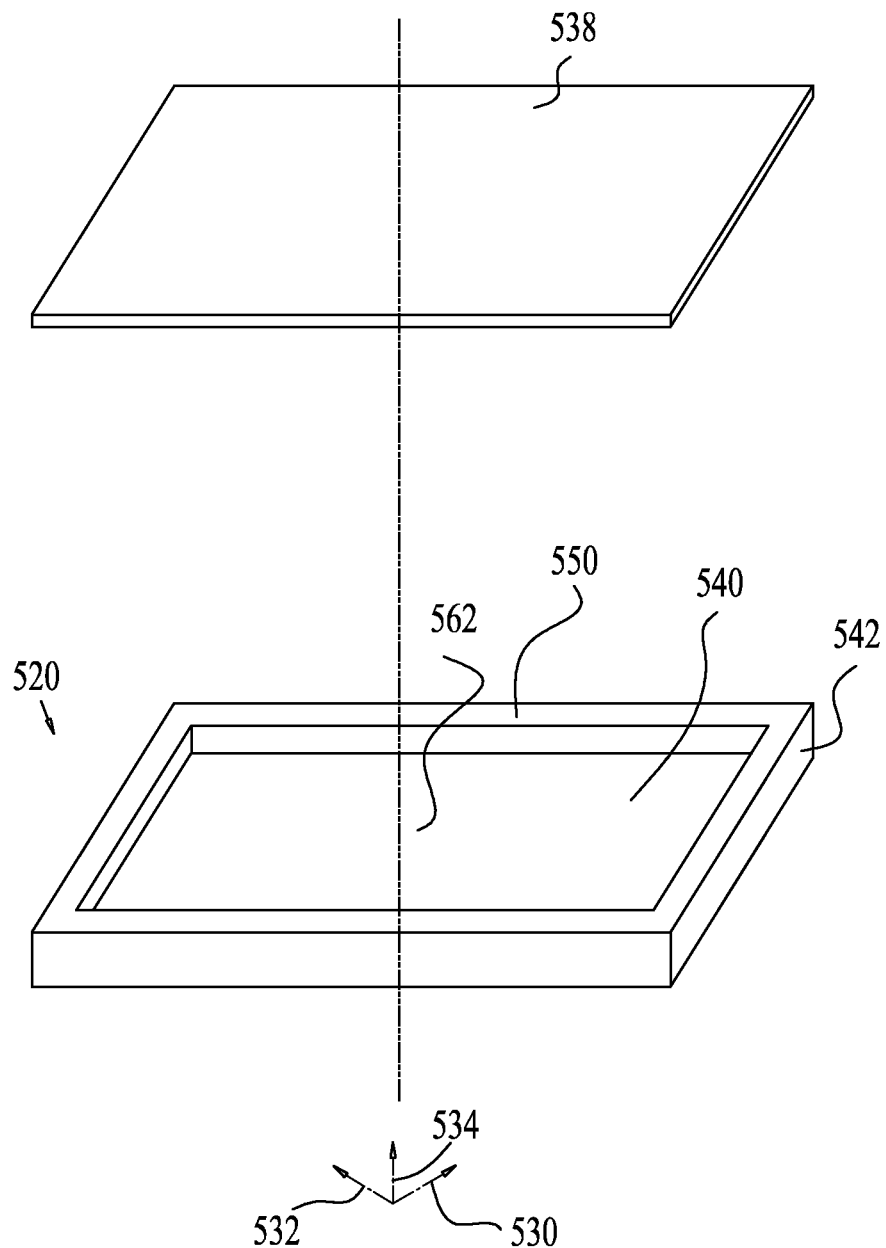
FIG. 10 is a simplified exploded view pictorial illustration of a reflector of the solar concentrator system of FIG. 1 constructed and operative in accordance with another embodiment of the present invention.

Reference is now made to FIG. 10, which is a simplified exploded view pictorial illustration of a reflector of the solar concentrator system of FIG. 1 constructed and operative in accordance with another embodiment of the present invention. In the embodiment shown in FIGS. 10-12B, a reflector 114 of FIG. 1 is shown to be deformed and bent so as to form concave surface 140, as seen in FIG. 3 hereinabove. As seen in FIG. 10, a support element 520 lies on a plane which is defined by a horizontal axis, designated by reference numeral 530, a vertical axis, designated by reference numeral 532 and a longitudinal axis, designated by reference numeral 534. Reflectors 114, prior to bending thereof, are configured in a generally flat rectangular shape and are here designated by reference numeral 538.

Support element 520 may be formed in any suitable form, such as a support element comprising a generally rectangular base 540 with walls 542 extending therefrom and along horizontal axis 530 a vertical axis 532.

Figure 11A:
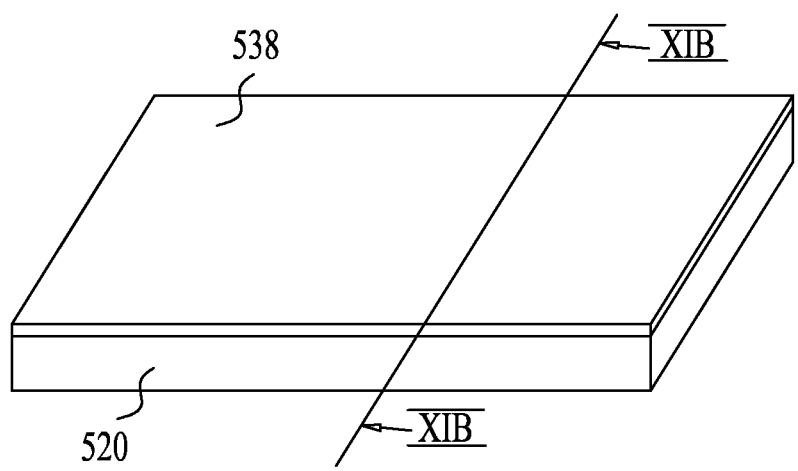
FIGS. 11A and 11B are a simplified pictorial illustration of the reflector of FIG. 10 shown at an initial stage of assembly and a simplified sectional illustration taken along lines XIB-XIB in FIG. 11A, respectively.
Figure 11B:
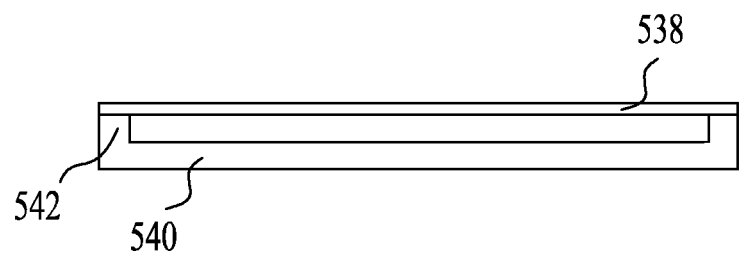

Reference is now made to FIGS. 11A and 11B, which are a simplified pictorial illustration of the reflector of FIG. 10 shown at an initial stage of assembly and a simplified sectional illustration taken along lines XIB-XIB in FIG. 11A, respectively. As seen in FIGS. 11A and 11B, reflector 538 is placed on an upper surface 550 (FIG. 10) of walls 542. The reflector 538 may be placed unfixed upon upper surface 550. Alternatively, the reflector 538 may be fixed to upper surface 550 or any other location of support element 520.

Figure 12A:
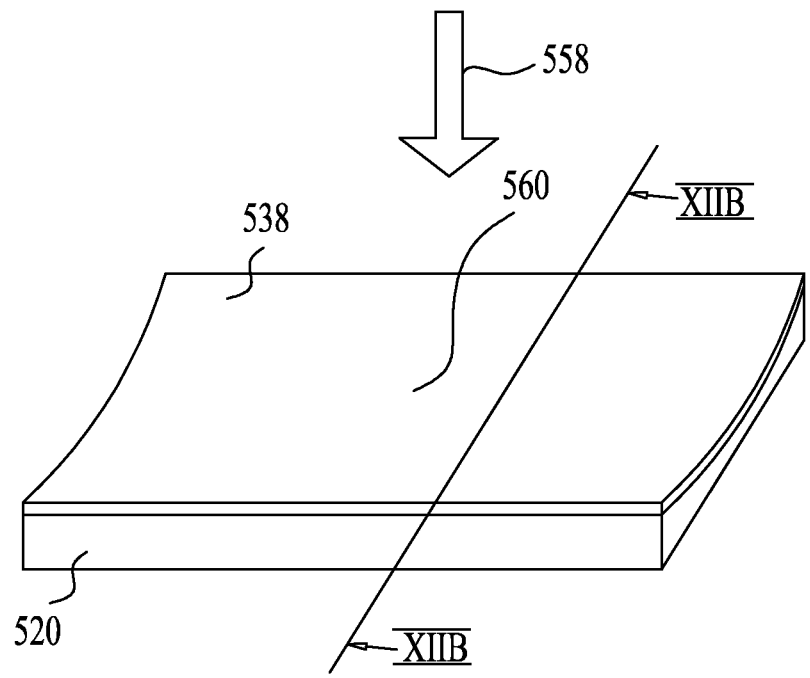
FIGS. 12A and 12B are a simplified pictorial illustration of the reflector of FIG. 10 shown at a final stage of assembly and a simplified sectional illustration taken along lines XIIB-XIIB in FIG. 12A, respectively.
Figure 12B:
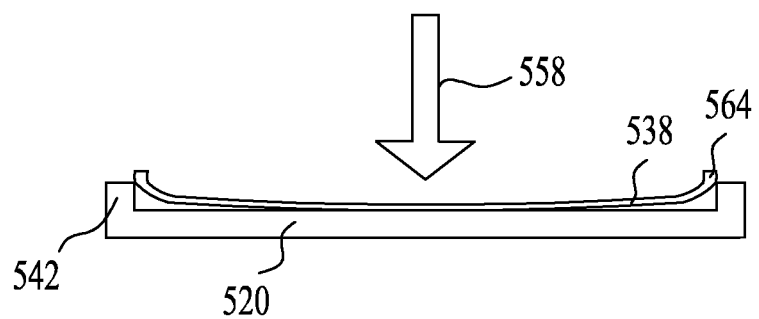

Reference is now made to FIGS. 12A and 12B, which are a simplified pictorial illustration of the reflector of FIG. 10 shown at a final stage of assembly and a simplified sectional illustration taken along lines XIIB-XIIB in FIG. 12A, respectively. As seen in FIGS. 12A and 12B, a mechanical force, illustrated by arrow 558, is applied on reflector 538 in the orientation of longitudinal axis 534 so as to force reflector 538 to deform, bend and extend at a central location 560 thereof down to a central location 562 (FIG. 10) of support element 520 while extending unfixed reflector edges 564 upwards. Thus deformation of reflector 538 results in configuring reflector 538 as a concave surface. As seen in FIG. 12A, the formed concave surface may define a parabolic surface in the horizontal axis 530 and the vertical axis 532.

The force 558 may be applied by any suitable method, such as by turning of a screw fixed to central location 560 of reflector 538. Alternatively, any suitable method may be used to apply force 558, such as by use of vacuum, for example.

Following deformation of reflectors 538, the reflector 538 may be fixed to support element 520 by any suitable means, such as by glue or clips. Alternatively, the reflector 538 may not be fixed to support element 520.

It is noted that support element 520 may be formed in any suitable form allowing the deformation of reflector 538. For example, support element 520 may be comprised of grid 320 of FIGS. 8-9B hereinabove.

Figure 13:
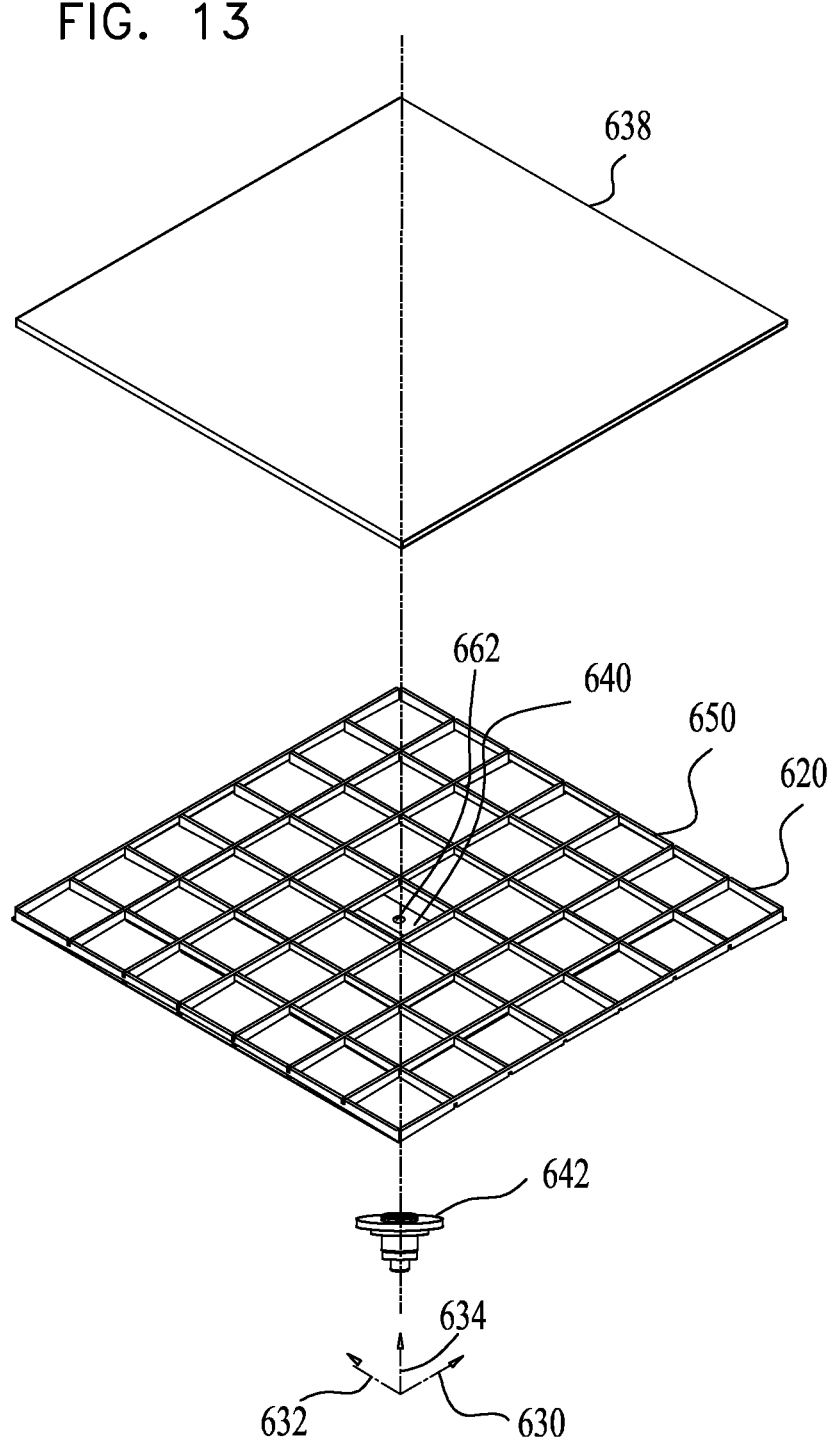
FIG. 13 is a simplified exploded view pictorial illustration of a reflector of the solar concentrator system of FIG. 1 constructed and operative in accordance with yet another embodiment of the present invention.

Reference is now made to FIG. 13, which is a simplified exploded view pictorial illustration of a reflector of the solar concentrator system of FIG. 1 constructed and operative in accordance with yet another embodiment of the present invention. In the embodiment shown in FIGS. 13-15B, a reflector 114 of FIG. 1 is shown to be deformed and bent so as to form concave surface 140, as seen in FIG. 3 hereinabove. As seen in FIG. 13, a support element 620 lies on a plane which is defined by a horizontal axis, designated by reference numeral 630, a vertical axis, designated by reference numeral 632 and a longitudinal axis, designated by reference numeral 634.

Reflectors 114, prior to bending thereof, are configured in a generally flat rectangular shape and are here designated by reference numeral 638. Reflectors 638 may be identical to reflectors 538 of FIGS. 10-12B.

Support element 620 may be formed in any suitable form, such as in the form of a grid. The grid may be identical to grid 320 shown in FIGS. 8-9B or may be a grid comprising unarched horizontal and vertical bars. Support element 620 may be provided with an attachment element 640 in any suitable location thereon, such as on an underside thereof. Attachment element 640 is provided for mounting a moving screw 642 thereon.

Figure 14A:
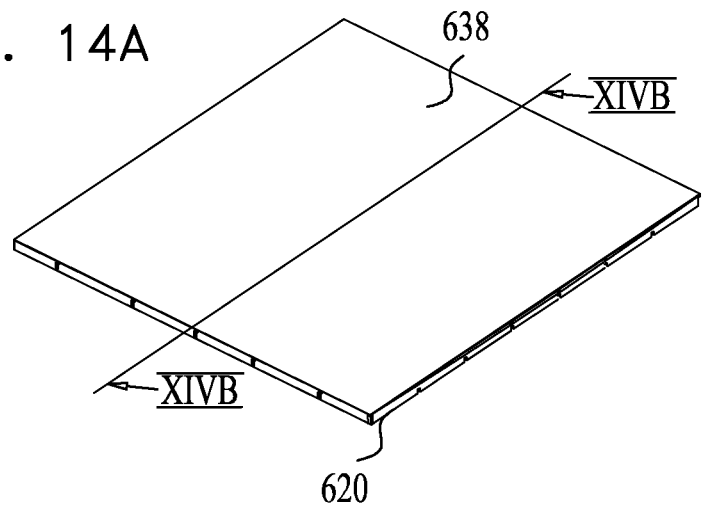
FIGS. 14A and 14B are a simplified pictorial illustration of the reflector of FIG. 13 shown at an initial stage of assembly and a simplified sectional illustration taken along lines XIVB-XIVB in FIG. 14A, respectively.
Figure 14B:
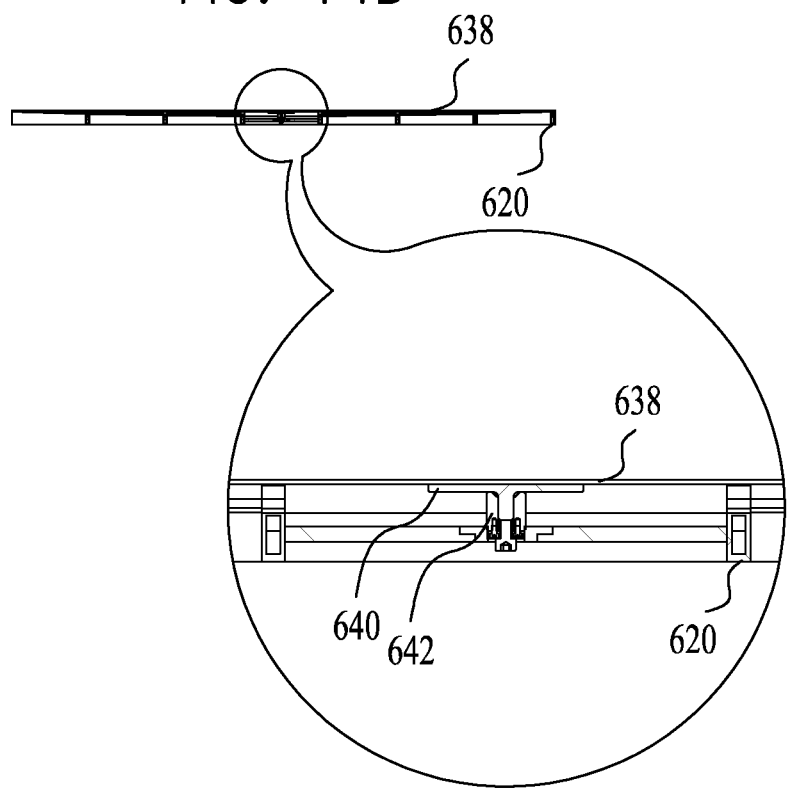

Reference is now made to FIGS. 14A and 14B, which are a simplified pictorial illustration of the reflector of FIG. 13 shown at an initial stage of assembly and a simplified sectional illustration taken along lines XIVB-XIVB in FIG. 14A, respectively. As seen in FIGS. 14A and 14B, reflector 638 is placed on an upper surface 650 (FIG. 13) of support element 620. The reflector 638 may be placed unfixed upon upper surface 650. Alternatively, the reflector 638 may be fixed to upper surface 650 or to any other location of support element 620.

Figure 15A:
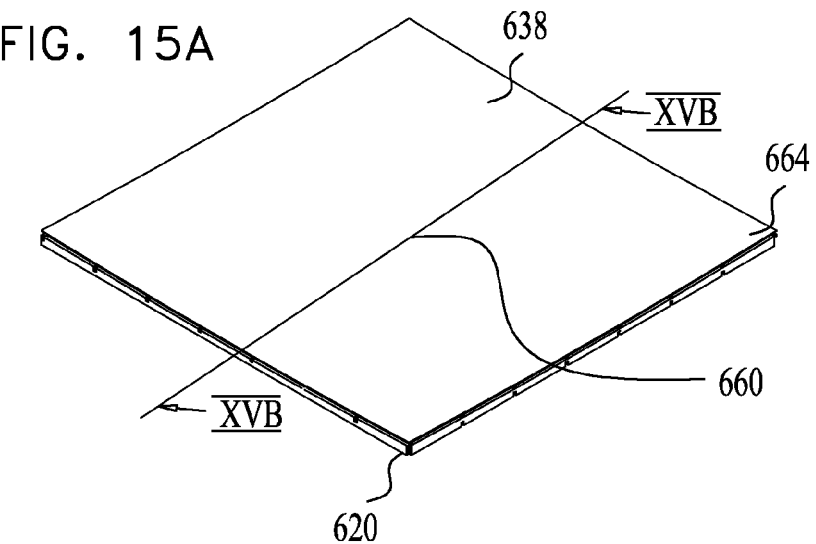
FIGS. 15A and 15B are a simplified pictorial illustration of the reflector of FIG. 13 shown at a final stage of assembly and a simplified sectional illustration taken along lines XVB-XVB in FIG. 15A, respectively.
Figure 15B:
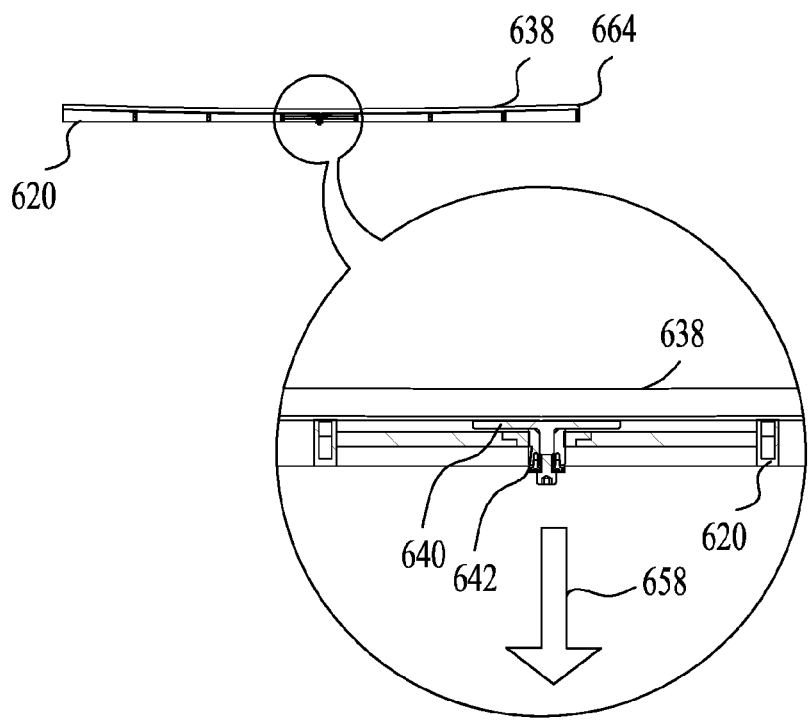

Reference is now made to FIGS. 15A and 15B, which are a simplified pictorial illustration of the reflector of FIG. 13 shown at a final stage of assembly and a simplified sectional illustration taken along lines XVB-XVB in FIG. 15A, respectively. As seen in FIGS. 15A and 15B, a mechanical force, illustrated by arrow 658, is applied on reflector 638 in the orientation of longitudinal axis 634 so as to force reflector 638 to deform, bend and extend at a central location 660 thereof down to a central location 662 (FIG. 13) of support element 620 while extending unfixed reflector edges 664 upwards. As seen in FIGS. 15A and 15B, the force is applied by turning the moving screw 642 downward along longitudinal axis 634 thereby forcing reflector 638 to deform.

Thus deformation of reflector 638 results in configuring reflector 638 as a concave surface.

Following deformation of reflectors 638, the reflector 638 may be fixed to support element 620 by any suitable means, such as by glue or clips. Alternatively, the reflector 638 may not be fixed to support element 620.

Figure 17:
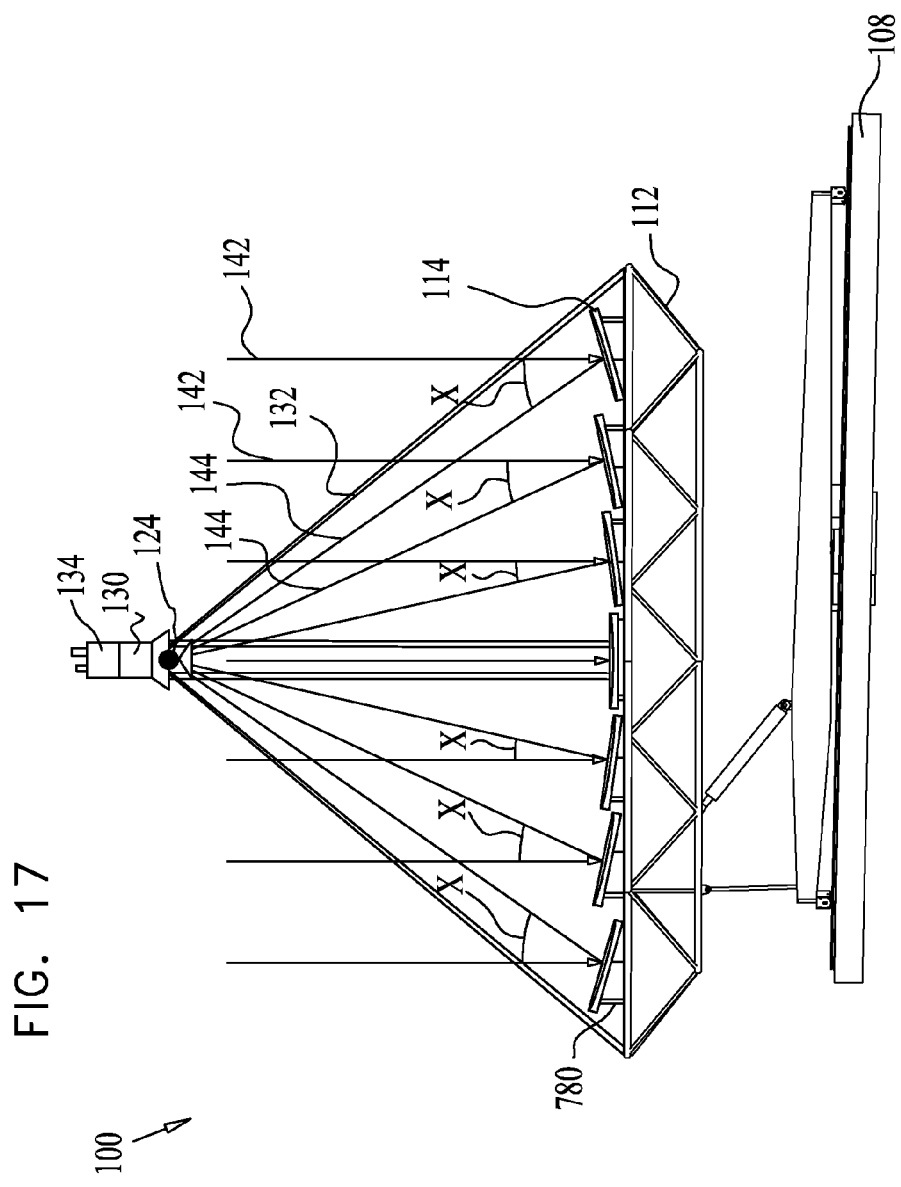
FIG. 17 is a simplified sectional illustration taken along lines XVII-XVII in FIG. 16.

Reference is now made to FIGS. 16 and 17, which is a simplified pictorial illustration of the solar concentrator system of FIG. 1 at an initial operational stage and a simplified sectional illustration taken along lines XVII-XVII in FIG. 16. In the embodiment shown in FIGS. 16 and 17 sun rays 142 (FIG. 17) impinge upon reflectors 114 thus allowing the sunlight to be reflected from reflectors 114 and be focused at predetermined focal location 124. In FIGS. 16-19 the receiver 130 and turbine 134 are shown to be placed at focal location 124, it being appreciated that the receiver 130 and turbine 134 may be obviated.

The reflectors 114 may be arranged in a Fresnel-like arrangement on support structure 112, as described hereinabove in reference to FIGS. 1-3. A reflector 114 forms angle X between ray 142 impinging thereon and reflected ray 144.

It is a particular feature of the present invention that any one of reflectors 114 may be engaged with a dislocation functionality for tilting a reflector 114 so as to reflect sunlight impinging thereon onto a location other than the predetermined focal location 124. Thus the reflectors 114 may be tilted to an angle smaller or larger than angle X so as to reduce or eliminate the sunlight focused at location 124, as will be further described with reference to FIGS. 18 and 19 hereinbelow. Thus the intensity of the sunlight focused at location 124 may be controlled. For example, in a geographical location wherein solar radiation from the sunlight is relatively moderate the reflectors 114 may be positioned so as to allow maximal reflection of sunlight to location 124, while in a geographical location wherein the solar radiation is relativity intense some of reflectors 114 may be offset so as to prevent reflection of sunlight therefrom to location 124.

Figure 18:
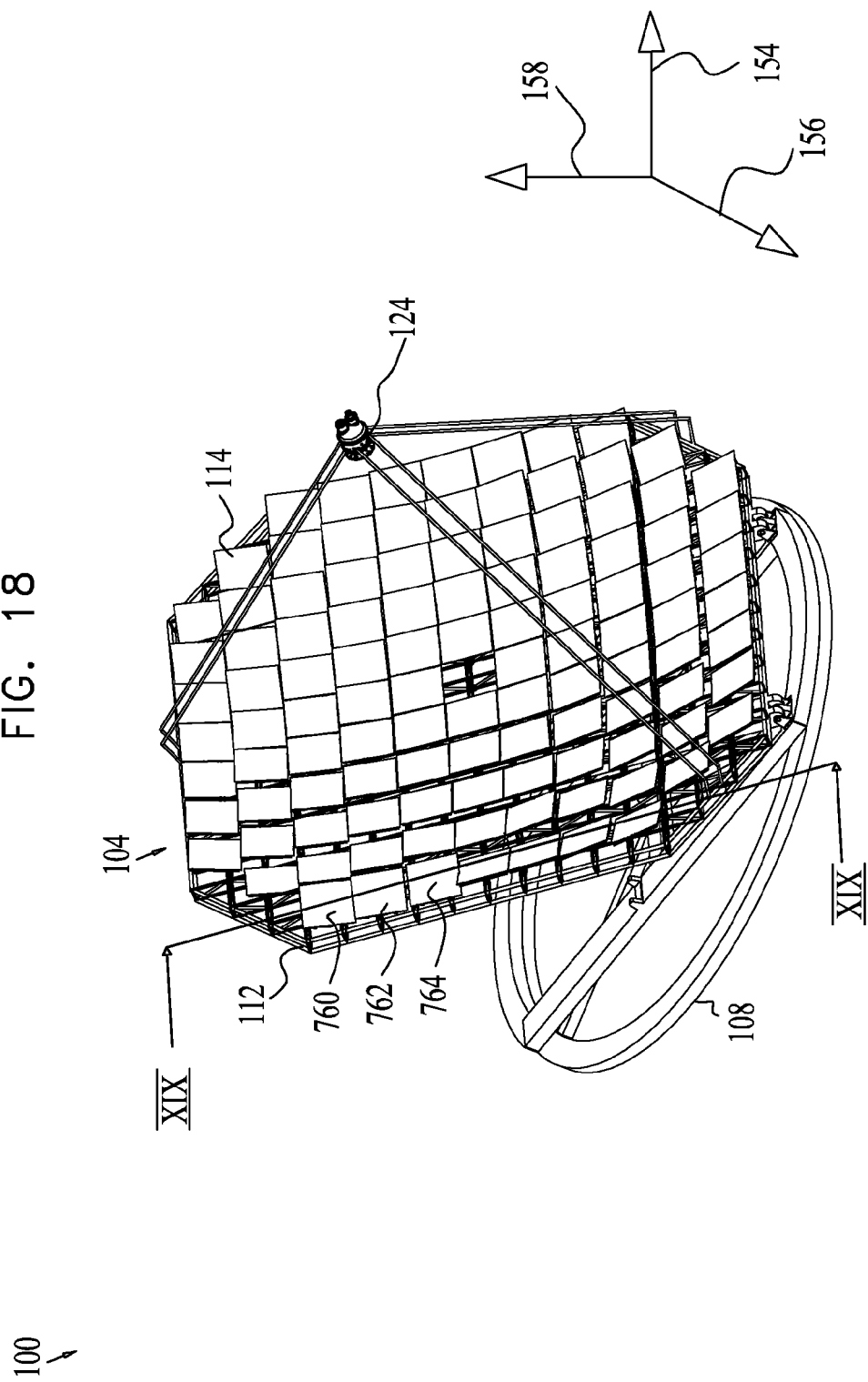
FIG. 18 is a simplified pictorial illustration of the solar concentrator system of FIG. 1 at a final operational stage.
Figure 19:
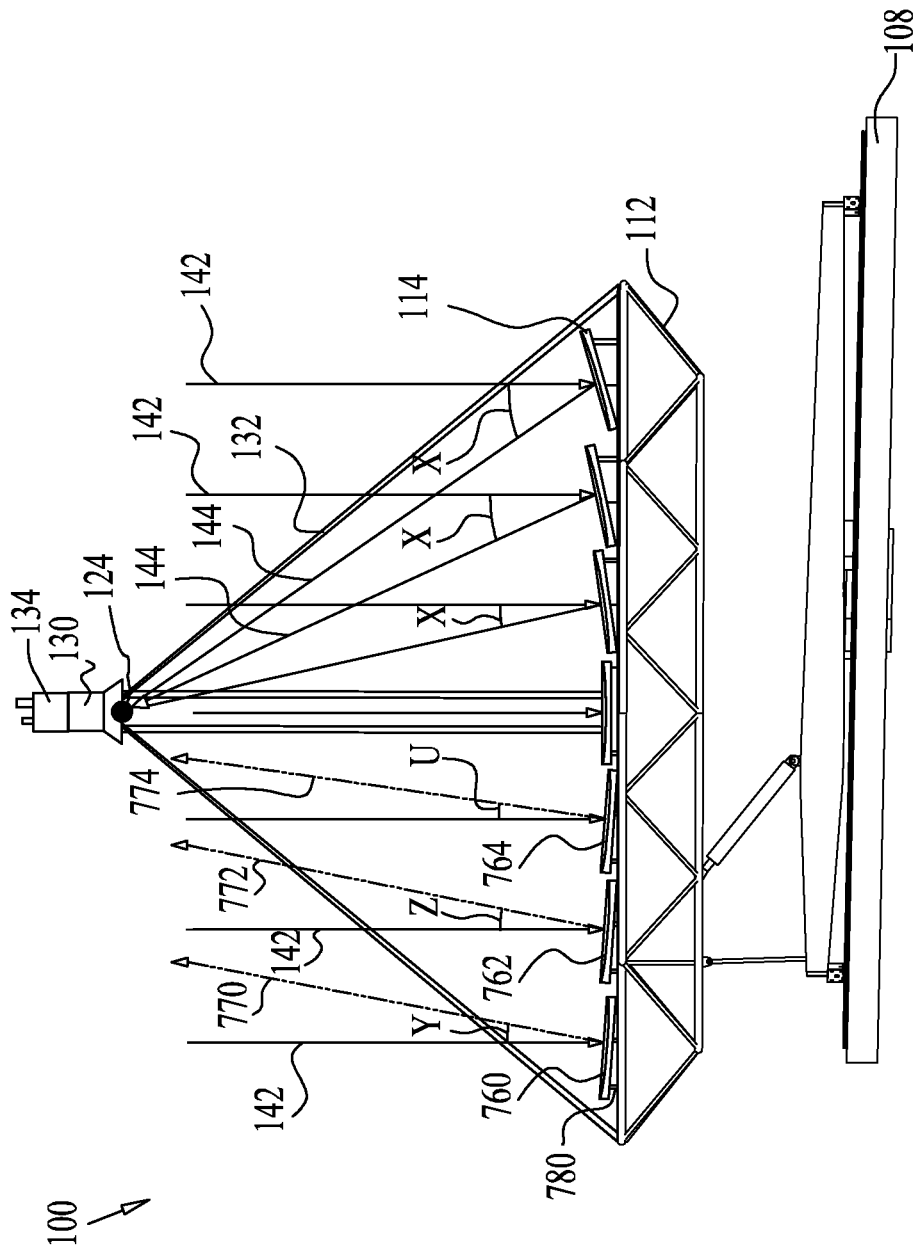
FIG. 19 is a simplified sectional illustration taken along lines XIX-XIX in FIG. 18.

Offset of reflectors 114 is illustrated in FIGS. 18 and 19, which is a simplified pictorial illustration of the solar concentrator system of FIG. 1 at a final operational stage and a simplified sectional illustration taken along lines XIX-XIX in FIG. 18. As seen in FIGS. 18 and 19, three reflectors, here designated by reference numeral 760, 762 and 764 are shown to be offset at an angle Y, Z and U, respectively, between sunray 142 and reflected respective rays 770, 772 and 774 which do not intersect with location 124. Thus wherein the reflectors 760, 762 and 764 are tilted, as shown in FIGS. 18 and 19, the number of reflected rays 144 reaching location 124 is less than the number of reflected rays 144 reaching location 124 wherein all reflectors 114 are positioned in a Fresnel-like arrangement, as shown in FIGS. 16 and 17.

It is noted that angles Y, Z and U are spatial angles defined by a horizontal angular displacement relative to horizontal axis 154, a vertical angular displacement relative to vertical axis 156 and a longitudinal angular displacement relative to longitudinal axis 158, shown in FIGS. 16 and 18.

It is noted that the any suitable arrangement of the reflectors 114 may be employed alternatively to the Fresnel-like arrangement so as to allow reflected rays 144 to reach location 124. In such an alternative arrangement a reflector 114 may be tilted to a suitable angle so as to reduce or eliminate the sunlight focused at location 124.

The dislocation functionality may comprise any suitable means. As seen in FIG. 17, for example, a reflector 114 may be mounted on a piston 780 operative to extend or contract to a predetermined length, as seen in FIG. 19, wherein piston 780 is contracted thereby titling reflectors 760, 762 and 764 and defocusing respective reflected rays 770, 772 and 774 away from location 124.

It is appreciated that a single reflector may be offset, or a plurality of reflectors may be offset, as shown in FIG. 19, so as to minimize the intensity of the solar radiation reaching location 124.

The number of reflectors to be offset and/or the degree of angles Y, Z or U may be predetermined in accordance with the geographical conditions of a specific location. For example, in Southern Spain wherein the solar radiation emitted from the sun is of relatively low intensity a single reflector may be positioned to be offset so as to lessen the intensity of the solar radiation reaching location 124. In contrast, in the Mojave Desert, wherein the solar radiation emitted from the sun is of relatively high intensity, a plurality of reflectors may be positioned to be offset so as to lessen the intensity of the solar radiation reaching location 124.

Additionally, the number of reflectors to be offset and/or the degree of angles Y, Z or U may be determined by a control system (not shown) operative to determine a number of reflectors to be offset and/or the degree of angles Y, Z or U in accordance with the ambient temperature at a given time or in accordance with any other ambient condition effecting the intensity of the solar radiation emitted from the sun. For example, during early evening hours wherein the solar radiation emitted from the sun is of relatively low intensity, no reflector 114 or a single reflector 114 may be positioned to be offset so as to lessen the intensity of the solar radiation reaching location 124. In contrast, during mid-noon wherein the solar radiation emitted from the sun is of relatively high intensity a plurality of reflectors may be positioned to be offset so as to lessen the intensity of the solar radiation reaching location 124.

Reference is now made to FIG. 20, which is a solar concentrator system constructed and operative in accordance with another embodiment of the present invention. As seen in FIG. 20, a solar concentrator system 800 generally comprises a solar concentrator support structure 802 typically mounted on a base 804. The support structure 802 may be formed in a parabolic-like shape or any other suitable shape allowing concentration of solar radiation emitted thereon.

On support structure 802 is mounted an array 810 of concentrating reflectors 814 mounted thereon. Reflectors 814 are provided to focus solar radiation impinging thereon. Reflectors 814 may be curved to define any suitable configuration, such as a parabolic curvature thereof or a spherical curvature thereof or the reflectors 814 may be flat.

The solar concentrator system 800 may be employed to provide concentrated solar radiation within a solar thermal energy system (not shown).

It will be appreciated by persons skilled in the art that the present invention is not limited by what has been particularly shown and described herein above. Rather the scope of the present invention includes both combinations and subcombinations of the various features described hereinabove as well as variations and modifications which would occur to persons skilled in the art upon reading the specifications and which are not in the prior art.

What is claimed is:

1. A solar concentrating system, comprising:
  a concentrator operative to track the Sun so as to concentrate incident sunlight on to a focal location, said concentrator comprising:
    a support structure having a generally flat upper surface; and
    an array of a plurality of discrete concentrating reflectors mounted at said generally flat upper surface of said support structure in a Fresnel-like reflector arrangement defining said concentrator as a Fresnel reflector,
  at least one of said discrete concentrating reflectors comprises a reflective surface facing the Sun, and said reflective surface being configured as a concave surface curved along two axes of said at least one discrete concentrating reflector, such that said incident sunlight impinging on said reflective surface is reflected on to said focal location.

2. The system according to claim 1, wherein said concave surface is configured as a portion of a paraboloid.

3. The system according to claim 1, wherein said support structure is configured as a space structure.

4. The system according to claim 1, wherein said concentrator is mounted on a base structure.

5. The system according to claim 1, wherein said support structure comprises protrusions provided on said generally flat upper surface of said support structure, said protrusions are formed with a Fresnel angular dislocation so as to allow said least one discrete concentrating reflector to be mounted on said generally flat upper surface of said support structure in accordance with said Fresnel angular dislocation of said protrusions.

6. The system according to claim 5, wherein said support structure further comprises at least one reflector support mounted on at least one respective protrusion, and said least one discrete concentrating reflector is mounted on said at least one reflector support.

7. The system according to claim 6, wherein said at least one reflector support comprises aligning screws operative to support said at least one discrete concentrating reflector thereon.

8. The system according to claim 7, wherein said aligning screws are aligned in accordance with said Fresnel angular dislocation.

9. The system according to claim 8, wherein alignment of said aligning screws is performed by a total station in optical and electrical communication with a prism reflector.

10. The system according to claim 9, wherein said prism reflector is mounted on a jig.

11. The system according to claim 10, wherein said jig is mounted on said reflector support.

12. A method for arranging a solar concentrating system in a Fresnel-like reflector arrangement, comprising:
providing a solar concentrating system according to claim 9;
measuring an angular inaccuracy of said Fresnel angular dislocation on said aligning screws; and
rotating said aligning screws to correct said Fresnel angular dislocation,
thereby arranging a solar concentrating system in a Fresnel-like reflector arrangement.

13. The method according to claim 12, wherein said measuring is performed by a total station in optical and electrical communication with a prism reflector, said reflector prism mounted on a jig and engaged with said aligning screws via said jig mounted on said reflector support comprising said aligning screws.

14. The system according to claim 8, wherein a portion of the plurality of discrete concentrating reflectors each comprise a reflective surface facing the Sun, each reflective surface being configured as a concave surface curved along two axes of each discrete concentrating reflector, such that said incident sunlight impinging on said each reflective surface is reflected on to said focal location.

15. The system according to claim 14, wherein said support structure comprises a plurality of reflector supports each comprising aligning screws, each reflector support is mounted on a respective protrusion, and each discrete concentrating reflector is mounted on a respective reflector support.

16. The system according to claim 1, further comprising a base structure for mounting said support structure thereon, said base structure being placed on a flat surface, said base structure comprising a rotatable portion operative to rotate about a longitudinal axis perpendicular to said flat surface upon a stationary annular portion, thereby allowing said concentrator to track the Sun.

17. The system according to claim 1, wherein each discrete concentrating reflector of the plurality of discrete concentrating reflectors, comprises a reflective surface facing the Sun, each reflective surface being configured as a concave surface curved along two axes of each discrete concentrating reflector, such that said incident sunlight impinging on said each reflective surface is reflected on to said focal location.

18. A solar concentrating system, comprising:
an array of a plurality of discrete concentrating reflectors mounted on a support structure, said reflectors being operative to reflect incident sunlight impinging thereon onto a predetermined focal location; and
a dislocation functionality engaged with at least one of said discrete concentrating reflectors configured for tilting said at least one discrete concentrating reflector so as to reflect incident sunlight impinging thereon onto a location other than said predetermined focal location.

19. The system according to claim 18, wherein said dislocation functionality comprises a piston.

20. The system according to claim 18, wherein a portion of said plurality of discrete concentrating reflectors are each tilted to reflect incident sunlight impinging thereon onto a location other than said predetermined focal location.

21. The solar concentrating system of claim 18, wherein said at least one discrete concentrating reflector comprises a reflective surface configured as a concave surface curved along two axes of said at least one discrete concentrating reflector.

22. A solar concentrating system, comprising:
a concentrator operative to track the Sun so as to concentrate incident sunlight on to a focal location, said concentrator comprising:
a support structure; and
an array of concentrating reflectors mounted on said support structure, wherein at least one of said reflectors is formed with a reflective surface facing the Sun and configured as a concave surface such that said incident sunlight impinging on said reflective surface is reflected on to said focal location,
said array of concentrating reflectors being mounted on said support structure in a Fresnel-like reflector arrangement thus defining said concentrator as a Fresnel reflector,
wherein said support structure is formed with protrusions on an upper surface thereof wherein said protrusions are formed with a Fresnel angular dislocation so as to allow said least one of said reflectors to be mounted on said support structure in accordance with said Fresnel angular dislocation of said protrusions,
wherein a reflector support is mounted on said protrusions and said least one of said reflectors is mounted on said reflector support,
wherein said reflector support comprises aligning screws operative to support said least one of said reflectors thereon,
wherein said aligning screws are aligned in accordance with said Fresnel angular dislocation, and
wherein alignment of said aligning screws is performed by a total station in optical and electrical communication with a prism reflector.

23. The system according to claim 22, wherein said prism reflector is mounted on a jig.

24. The system according to claim 23, wherein said jig is mounted on said reflector support.

25. The system according to claim 22, wherein a portion of the plurality of discrete concentrating reflectors each comprise a reflective surface facing the Sun, said each reflective surface being configured as a concave surface curved along two axes of each discrete concentrating reflector, such that said incident sunlight impinging on said each reflective surface is reflected on to said focal location.

26. The system according to claim 25, wherein said support structure comprises a plurality of reflector supports each comprising aligning screws, each reflector support is mounted on a respective protrusion, and each discrete concentrating reflector is mounted on a respective reflector support.

27. A method for arranging a solar concentrating system in a Fresnel-like reflector arrangement, comprising:
providing a solar concentrating system comprising:
a concentrator operative to track the Sun so as to concentrate incident sunlight on to a focal location, said concentrator comprising:
a support structure; and
an array of concentrating reflectors mounted on said support structure, wherein at least one of said reflectors is formed with a reflective surface facing the Sun and configured as a concave surface such that said incident sunlight impinging on said reflective surface is reflected on to said focal location,
said array of concentrating reflectors being mounted on said support structure in a Fresnel-like reflector arrangement thus defining said concentrator as a Fresnel reflector,
wherein said support structure is formed with protrusions on an upper surface thereof wherein said protrusions are formed with a Fresnel angular dislocation so as to allow said least one of said reflectors to be mounted on said support structure in accordance with said Fresnel angular dislocation of said protrusions,
wherein a reflector support is mounted on said protrusions and said least one of said reflectors is mounted on said reflector support,
wherein said reflector support comprises aligning screws operative to support said least one of said reflectors thereon,
wherein said aligning screws are aligned in accordance with said Fresnel angular dislocation, and
wherein alignment of said aligning screws is performed by a total station in optical and electrical communication with a prism reflector;
measuring an angular inaccuracy of said Fresnel angular dislocation on said aligning screws; and
rotating said aligning screws to correct said Fresnel angular dislocation,
thereby arranging a solar concentrating system in a Fresnel-like reflector arrangement,
wherein said measuring is performed by a total station in optical and electrical communication with a prism reflector, said reflector prism mounted on a jig and engaged with said aligning screws via said jig mounted on said reflector support comprising said aligning screws.

* * * * *